(12) United States Patent
Inoue et al.

(10) Patent No.: US 12,496,986 B2
(45) Date of Patent: Dec. 16, 2025

(54) VEHICLE DEVICE

(71) Applicant: DENSO CORPORATION, Kariya (JP)

(72) Inventors: Yoshiaki Inoue, Kariya (JP); Kenichi Ohnishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 203 days.

(21) Appl. No.: 18/357,770

(22) Filed: Jul. 24, 2023

(65) Prior Publication Data

US 2023/0406236 A1    Dec. 21, 2023

Related U.S. Application Data

(63) Continuation of application No. PCT/JP2022/000237, filed on Jan. 6, 2022.

(30) Foreign Application Priority Data

Jan. 26, 2021   (JP) .................................. 2021-010336

(51) Int. Cl.
*B60R 16/02* (2006.01)
*G06F 13/10* (2006.01)

(52) U.S. Cl.
CPC .............. *B60R 16/02* (2013.01); *G06F 13/10* (2013.01); *G06F 2213/40* (2013.01)

(58) Field of Classification Search
None
See application file for complete search history.

(56) References Cited

U.S. PATENT DOCUMENTS

| | | | |
|---|---|---|---|
| 2008/0248742 A1* | 10/2008 | Bauer | H04M 1/6075 455/3.06 |
| 2011/0126031 A1 | 5/2011 | Oku | |
| 2014/0009304 A9* | 1/2014 | Bauer | G08C 17/00 340/870.01 |
| 2015/0163644 A1* | 6/2015 | Soda | H04W 4/80 455/3.06 |
| 2018/0239896 A1 | 8/2018 | Kato et al. | |
| 2019/0260868 A1* | 8/2019 | Graham | H04W 4/90 |
| 2021/0218813 A1 | 7/2021 | Kanamori | |

FOREIGN PATENT DOCUMENTS

| | | |
|---|---|---|
| JP | 6130617 B1 | 5/2017 |
| WO | WO-2010116523 A1 | 10/2010 |
| WO | WO-2020050315 A1 | 3/2020 |

* cited by examiner

*Primary Examiner* — Jelani A Smith
*Assistant Examiner* — Davin Seol
(74) *Attorney, Agent, or Firm* — Harness, Dickey & Pierce, P.L.C.

(57) ABSTRACT

A vehicle device in one embodiment includes: a control unit accesses a peripheral device and executes functions when a vehicle is used; a connection portion to which an external device is connected, the external device communicable with the control unit and executing a function when the vehicle is used; and a determination unit determining whether the external device is connected to the connection portion in an executable state of the function. The control unit activates the external device to enable execution of the function and stops at least one function when the external device is determined to be connected to the connection portion in the executable state. The control unit executes the at least one function being stopped for the external device to execute the function when the external device is determined to be no longer in the executable state.

7 Claims, 16 Drawing Sheets

VEHICLE DEVICE

CROSS REFERENCE TO RELATED APPLICATIONS

This application is a continuation application of International Patent Application No. PCT/JP2022/000237 filed on Jan. 6, 2022, which designated the U.S. and claims the benefit of priority from Japanese Patent Application No. 2021-010336 filed on Jan. 26, 2021. The entire disclosure of all the above applications is incorporated herein by reference.

TECHNICAL FIELD

The present disclosure relates to a vehicle device.

BACKGROUND

In recent years, installation of multiple operating systems in a vehicle device is rapidly popular. Hereinafter, the operating system will be referred to as OS. In this case, a so-called real-time OS that is suitable for a process that requires real-time property, and a general-purpose OS that is suitable for a multimedia process, such as displaying on a display, and is used in general mobile terminals are installed on the vehicle device.

SUMMARY

In one aspect of the present disclosure, a vehicle device includes: a control unit that is configured to access a peripheral device and execute functions of the control unit when a vehicle is used; a connection portion to which an external device is connected, the external device being communicable with the control unit and configured to execute a function of the external device when the vehicle is used; and a determination unit that is configured to determine whether the external device is connected to the connection portion in an executable state where the external device is capable of executing the function of the external device. The control unit is further configured to: activate the external device to enable execution of the function of the external device and stop at least one function among the functions of the control unit when the external device is determined to be connected to the connection portion in the executable state where the external device is capable of executing the function of the external device; and execute the at least one function of the control unit that is being stopped for the external device executing the function of the external device when the external device is determined, during operation of the vehicle device, to be no longer in the executable state where the external device is capable of executing the function of the external device.

BRIEF DESCRIPTION OF DRAWINGS

Objects, features and advantages of the present disclosure will be clearer from the following detailed description with reference to the accompanying drawings, wherein.

DESCRIPTION OF EMBODIMENTS

Figure 1:
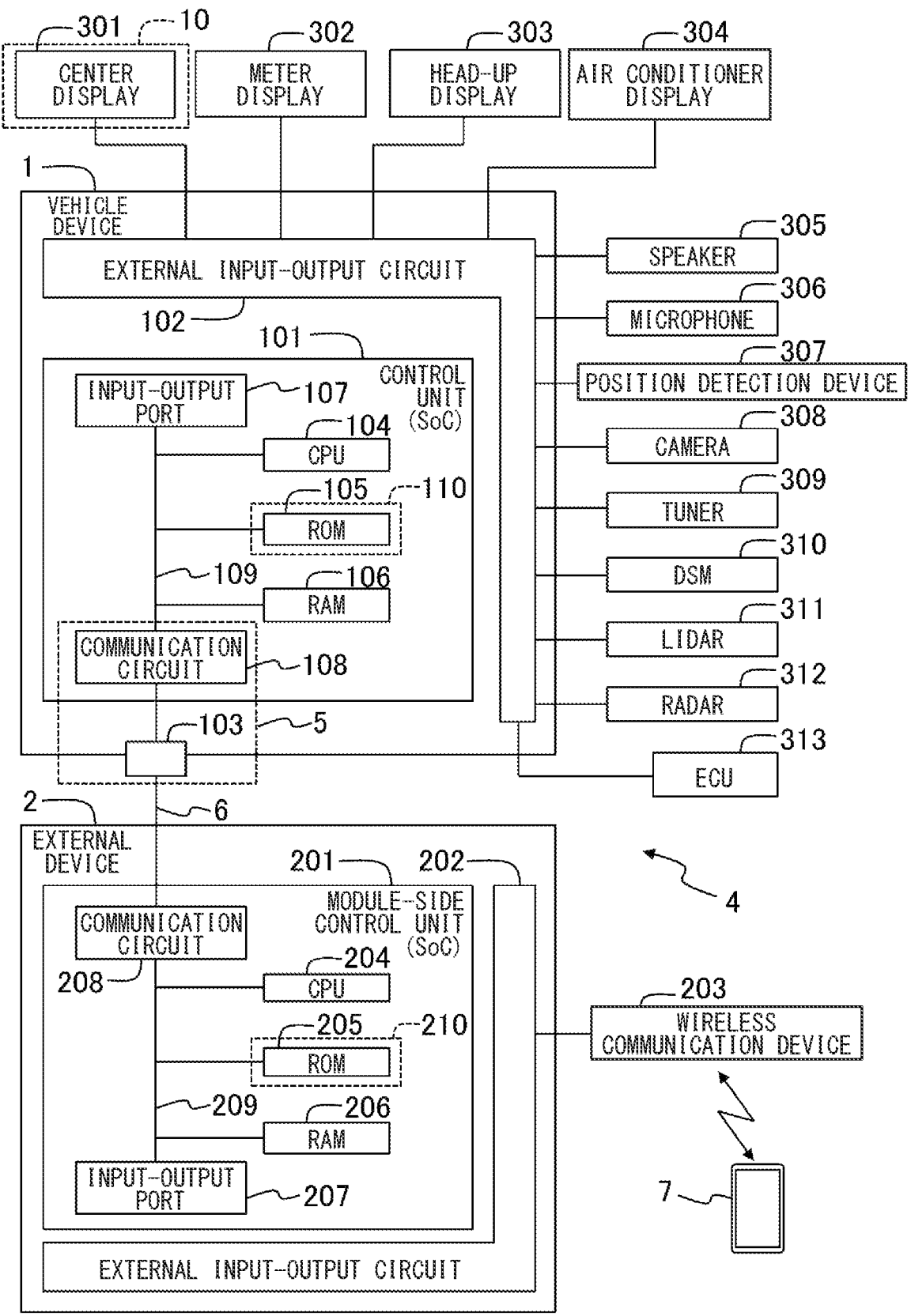
FIG. 1 is a diagram schematically illustrating an electric configuration example of a vehicle device and an external device in a first embodiment.

First, for the understanding of the following embodiments, the technology related to the present application will be described. A general-purpose OS used in a mobile terminal or the like is updated relatively frequently, and a function installed on the OS is also expanded by the update. As the function is expanded, the required hardware performance also increases.

However, in a vehicle device installed in a vehicle, it may be difficult to take action to update hardware, for example, every year or every few years after shipment. The present disclosure has been made in view of the circumstances described above, and one of objectives of the present disclosure is to provide a vehicle device capable of improving performance even after shipment.

In a first aspect of the present disclosure, a vehicle device includes: a control unit that is configured to access a peripheral device and execute functions of the control unit when a vehicle is used; a connection portion to which an external device is connected, the external device being communicable with the control unit and configured to execute a function of the external device when the vehicle is used; and a determination unit that is configured to determine whether the external device is connected to the connection portion in an executable state where the external device is capable of executing the function of the external device. The control unit is further configured to: activate the external device to enable execution of the function of the external device and stop at least one function among the functions executable by the control unit when the external device is determined to be connected to the connection portion in the executable state where the external device is capable of executing the function of the external device; and execute the at least one function of the control unit that is stopped for the external device to execute the function of the external device when the external device is determined, during operation of the vehicle device, to be no longer in the executable state where the external device is capable of executing the function of the external device.

In a second aspect of the present disclosure, a vehicle device includes: a control unit that is configured to access a peripheral device and execute functions of the control unit when a vehicle is used; a connection portion to which an external device is connected, the external device being communicable with the control unit and configured to execute a function of the external device when the vehicle is used; and a determination unit that is configured to determine whether the external device is connected to the connection portion in an executable state where the external device is capable of executing the function of the external device. The determination unit is further configured to repeatedly determine whether the external device is in the executable state where the external device is capable of executing the function of the external device during operation of the vehicle device. The control unit is further configured to activate the external device to enable execution of the function of the external device and stop at least one function among the functions executable by the control unit when the external device is determined to be connected to the connection portion in the executable state where the external device is capable of executing the function of the external device.

In a third aspect of the present disclosure, a vehicle device includes: at least one processor; and a connection portion to which an external device is connected, the external device being communicable with the processor and configured to execute a function of the external device when a vehicle is used. The at least one processor is configured to: access a peripheral device and execute functions of the vehicle device when the vehicle is used; determines whether the external device is connected to the connection portion in an executable state where the external device is capable of executing the function of the external device; activate the external device to enable execution of the function of the external device and stop at least one function among the functions executable by the vehicle device when the external device is determined to be connected to the connection portion in the executable state where the external device is capable of executing the function of the external device; and execute the at least one function of the vehicle device that is stopped for the external device to execute the function of the external device when the external device is determined, during operation of the vehicle device, to be no longer in the executable state where the external device is capable of executing the function of the external device.

Accordingly, for example, in a situation where, although the vehicle has the required performance at the time of shipment, a subsequent update of the operating system requires higher performance, the performance can be easily improved by connecting the external device. When the external device is activated, the control unit stops at least one among the functions executable by the control unit. Accordingly, an excessive increase in power consumption due to the improved performance can be reduced.

Hereinafter, multiple embodiments will be described. The same reference numeral is given to the substantially common part in each embodiment.

First Embodiment

Hereinafter, a first embodiment will be described. As illustrated in FIG. 1, a vehicle device 1 is implemented as, for example, a semiconductor integrated circuit including an SoC, and can be connected to an external device 2 and can access a peripheral device 3. The vehicle device 1, the external device 2, and each peripheral device 3 form a vehicle system 4 by operating in cooperation with each other.

Specifically, the vehicle device 1 includes a control unit 101 that can execute function provided when the vehicle is used, an external input-output circuit 102 for inputting and outputting various signals to and from the peripheral device 3, a USB connector 103 to which the external device 2 that can communicate with the control unit 101 and can execute function provided when the vehicle is used is connected, and the like. The SoC is an abbreviation for System on a Chip, and USB is an abbreviation for Universal Serial Bus. In FIG. 1, the external input-output circuit 102 is illustrated as one block for the sake of simplicity of description, but the external input-output circuit 102 can include multiple circuits corresponding to the peripheral devices 3.

The control unit 101 includes a CPU 104, a ROM 105, a RAM 106, an input-output port 107, a communication circuit 108, and the like, which are connected by a bus 109. The CPU 104 executes programs stored in the ROM 105 to execute various processes for controlling the vehicle device 1 and various functions provided when the vehicle is used. A part or all of the functions executed by the CPU 104 can be implemented in hardware by one or multiple ICs.

In the present embodiment, as the function provided when the vehicle is used, a function provided to a user who uses the vehicle, and a function for controlling the peripheral device 3 including an in-vehicle device, which is required to use the vehicle even when the user does not directly grasp the function are assumed. In other words, the function provided when the vehicle is used means a function that can be provided by the vehicle device 1 and a function that can be provided by the external device 2 via the vehicle device 1.

The ROM 105 is, for example, a non-volatile memory including an eMMC. The eMMC is an abbreviation for embedded Multi Media Card. The ROM 105 stores various programs executed by the CPU 104, data referred to when the programs are executed, data mainly used for vehicle equipment, such as a set temperature of an air conditioner, a position or an angle of a seat or a steering wheel, data mainly used for the provided function, such as a home position or a telephone number used for navigation, and music, and the like. Hereinafter, among these data, data unique to the user, such as a seat position and the telephone number, are also referred to as user information.

The ROM 105 includes a non-volatile memory, and is provided with a read-only area and a read-write area. For example, data that is basically not rewritten, such as an OS image, is stored in the read-only area, while data stored even when power supply of the vehicle device 1 is turned off is stored in the read-write area. The ROM 105 forms a storage unit 110.

The RAM 106 includes a volatile memory and temporarily stores data, such as a calculation result. The data stored in the RAM 106 is stored in the read-write area of the ROM 105, for example, when an operation of the vehicle device 1 is terminated, as required.

The input-output port 107 is a circuit for inputting and outputting signals between the control unit 101 and the peripheral device 3 or the external device 2. The communication circuit 108 conforms to the USB standard in the present embodiment, and transmits and receives data to and from the external device 2 via the USB connector 103, which is physical connection means. The USB connector 103 and communication circuit 108 form a connection portion 5 in the present embodiment.

The external device 2 is implemented, for example, as the semiconductor integrated circuit including the SoC, and is formed as a USB module connected to the vehicle device 1 by using an USB in the present embodiment. The external device 2 is communicably connected to the control unit 101 of the vehicle device 1 via a cable 6 by using the USB, so that the peripheral device 3 can be accessed via the vehicle device 1. The external device 2 receives the power supply from the vehicle device 1 via the USB connector 103 during the operation.

The external device 2 includes a module-side control unit 201 that can execute the function provided when the vehicle is used, and an external input-output circuit 202 for inputting and outputting various signals to and from the peripheral device 3 or a wireless communication device 203. The module-side control unit 201 includes a CPU 204, a ROM 205, a RAM 206, an input-output port 207, a communication circuit 208, and the like, which are connected by a bus 209.

In FIG. 1, the external input-output circuit 202 is illustrated as one block for the sake of simplicity of description, but the external input-output circuit 202 can include multiple circuits corresponding to devices assumed to be connected to the external device 2, such as the wireless communication device 203.

The CPU 204 executes programs stored in the ROM 205 to execute various functions provided when the communication with the vehicle device 1 is performed or the vehicle is used. The ROM 205 forms a module-side storage unit 210 that stores the programs executed by the CPU 204 or data referred to when the programs are executed. The module-side storage unit 210 of the external device 2 can also store data, such as the user information, transmitted from the vehicle device 1.

In the present embodiment, the module-side control unit 201 has higher processing performance than the control unit 101 of the vehicle device 1. Therefore, when the same process is executed, the process can be completed in a shorter time in the external device 2 than in the vehicle device 1. A part or all of the functions executed by the CPU 204 can be implemented in hardware by one or multiple ICs.

The input-output port 207 is a circuit for inputting and outputting signals between the module-side control unit 201 and other devices. In the present embodiment, as other devices, the vehicle device 1, the peripheral device 3 controlled via the vehicle device 1, for example, the wireless communication device 203 that communicates with the mobile terminal 7 owned by the user, and the like are assumed.

The communication circuit 208 conforms to the USB standard for communicating with the vehicle device 1 in the present embodiment. The wireless communication device 203 includes a wireless communication unit corresponding to, for example, Wi-Fi (registered trademark) or Bluetooth (registered trademark), and performs wireless communication with the mobile terminal 7. The wireless communication device 203 may have a function of communicating with the mobile terminal 7 by using a wired connection method.

As the peripheral devices 3 connected to the vehicle device 1, for example, a center display 301, a meter display 302, a head-up display 303, an air conditioner display 304, a speaker 305, a camera 306, a microphone 307, a position detection device 308, a tuner 309, a DSM 310, an LIDAR 311, a radar 312, an ECU 313, and the like are assumed. However, the type or the number of the peripheral devices 3 illustrated in FIG. 1 is merely an example, and the vehicle device 1 does not always have to be connected to all of these peripheral devices 3, and another peripheral device 3 (not illustrated) can be connected.

The center display 301 is disposed, for example, in front between a driver's seat and a front passenger seat. The center display 301 is used, for example, as a display screen in a case of executing a navigation function or an operation screen in a case of using a touch panel (not illustrated) provided corresponding to a display region. That is, the center display 301 functions as an input unit 10 for inputting an operation of the user.

However, a configuration can be adopted in which, as the input unit 10, other than the touch panel, for example, mechanical operation switches (not illustrated) is disposed around the screen to input the operation. As the input unit 10, another display or steering switch (not illustrated) can be adopted, or the other display or steering switch can be shared with the touch panel or the operation switches.

A meter display 302 is disposed in front of the steering wheel, and displays a meter, such as speed or the number of revolutions, and displays a warning light and the like. The head-up display 303 displays various types of information on a windshield disposed in front of a driver or a display board disposed on a dashboard. The air conditioner display 304 displays information on control of the air conditioner, such as a current set temperature or an outside air temperature. However, the air conditioner display 304 can be provided exclusively, and a configuration can also be adopted in which a part of the other display is used.

The speaker 305 is installed inside a vehicle compartment and outputs speech based on speech data output from the vehicle device 1 or the external device 2. The speaker 305 is used, for example, for a warning from the vehicle device 1 or the external device 2, an operation guide, reproduction of music, or the like. The microphone 307 is installed inside the vehicle compartment and outputs speech uttered by an occupant of the vehicle to the vehicle device 1 or the external device 2 as the speech data. The microphone 307 is used for inputting a speech command for operating the vehicle device 1 or the external device 2. The microphone 307 and the speaker 305 can be used for speech input or speech output during a hands-free call using the mobile terminal 7.

The position detection device 308 includes a GPS receiver, a gyro sensor, or the like (not illustrated), and acquires a current position or a direction of the vehicle. The GPS is an abbreviation for Global Positioning System. The GPS receiver receives GPS positioning signals transmitted from GPS satellites and outputs the received GPS positioning signals, and the gyro sensor detects the angular velocity of rotation about an X axis, a Y axis, and a Z axis that are orthogonal to each other.

The camera 306 is attached to, for example, a rear side of the vehicle and continuously images a situation behind the vehicle. The image captured by the camera 306 is displayed on the center display 301 or the other display together with, for example, a detection result of an object present in the image, guide lines for guiding the vehicle, or the like. The tuner 309 receives radio broadcast signals of an AM broadcast and an FM broadcast. As the tuner 309, a unit for receiving a television broadcast can also be provided.

The DSM 310 is a driver status monitor that includes an imaging device or the like, and detects a state of the driver by image analysis of a face image obtained by imaging a driver's face. The DSM 310 is an abbreviation for Driver Status Monitor. The LIDAR 311 detects the position of the object present around the vehicle by transmitting and receiving laser light. The LIDAR 311 is an abbreviation for Light Detection and Ranging.

The radar 312 detects the position of the object present around the vehicle by transmitting and receiving waves of the radar 312 in the millimeter wave band. The driver is notified of the detection results by the DSM 310, the LIDAR 311, or the radar 312 by, for example, caution display or warning display on the display or speech output from the speaker 305.

The ECU 313 is an electronic device installed in the vehicle. In general, multiple ECUs 313 are installed in the vehicle, and the vehicle device 1 acquires various types of information on the vehicle, such as a driving state of a drive unit, such as an engine or a motor, or an opening and closing state of a door, from the ECUs 313. The ECU 313 is an abbreviation for Electronic Control Unit.

Although one ECU 313 is illustrated in FIG. 1 for the sake of simplicity of description, the multiple ECUs 313 are installed in the vehicle, and the vehicle device 1 is communicably connected to the multiple ECUs 313 via an in-vehicle network, such as CAN. The CAN is an abbreviation for Controller Area Network.

Figure 2:
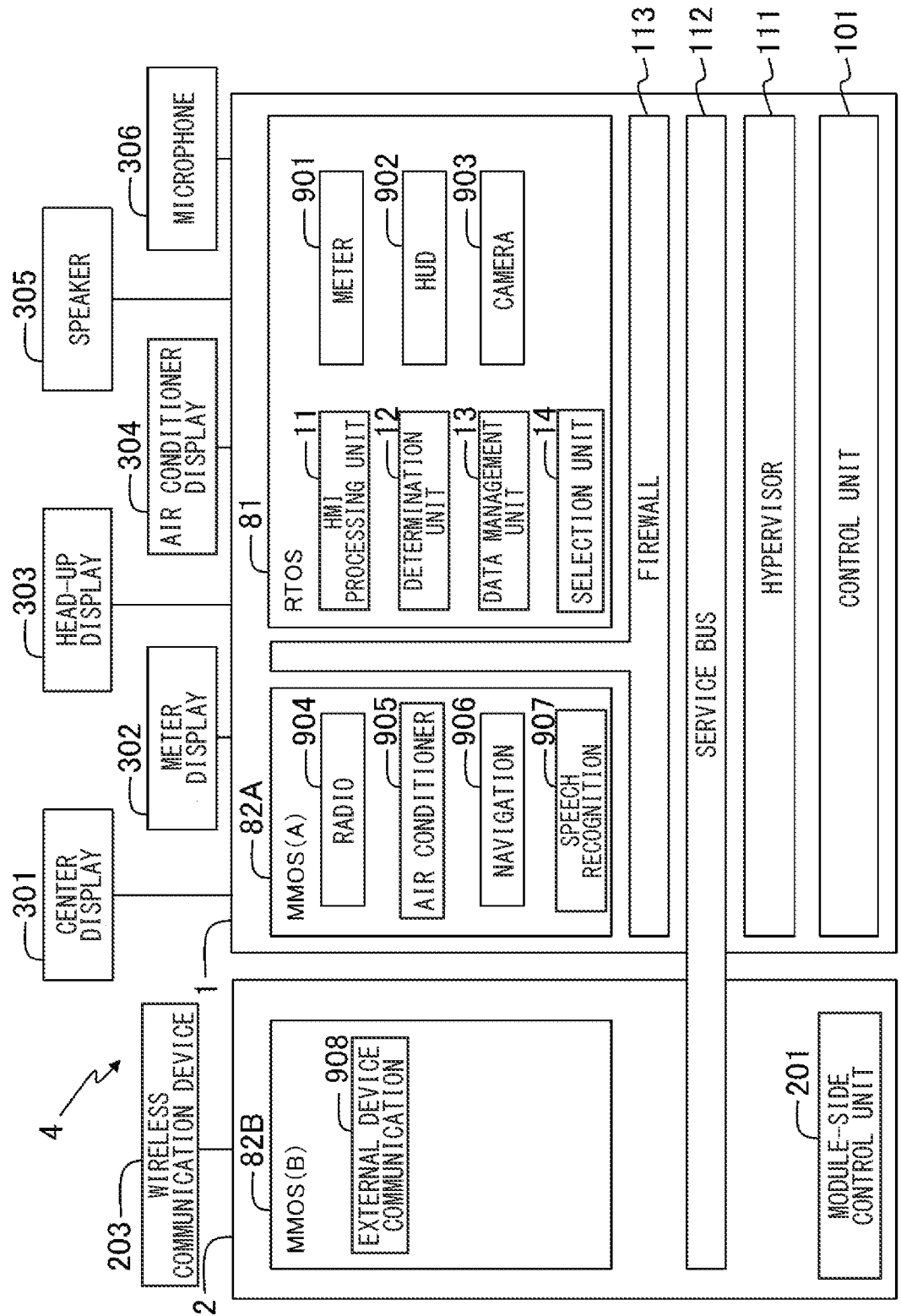
FIG. 2 is a diagram schematically illustrating a software configuration example of the vehicle device and the external device.

Next, a basic software configuration of the vehicle device 1 will be described. As illustrated in FIG. 2, the vehicle device 1 has a virtual environment in which multiple operating systems can operate. Hereinafter, the operating system will be referred to as an OS 8. The OS is an abbreviation for Operating System. In FIG. 2, illustration of some peripheral devices 3 is omitted for the sake of simplicity of description.

In the vehicle device 1, a hypervisor 111, a service bus 112, a firewall 113, an RTOS 81, and an MMOS 82A are installed on the control unit 101. The RTOS 81 is an abbreviation for Real Time OS, and the MMOS 82 is an abbreviation for Multi Media OS. In the present embodiment, since the MMOS 82 is installed on each of the vehicle device 1 and the external device 2, in order to easily distinguish between the two MMOSs 82, the MMOS 82 installed on the vehicle device 1 is denoted by A, and the MMOS 82 installed on the external device 2 is denoted by B.

In the present embodiment, Android (registered trademark) is adopted as the MMOS 82. Hereinafter, when the matter common to the RTOS 81 and the MMOS 82 are described, the common matter may simply be referred to as the OS 8. When the matter common to the MMOS 82A and the MMOS 82B are described, the common matter may be simply referred to as the MMOS 82. The MMOS 82A2 and MMOS 82B are the same version or sufficiently compatible versions.

Since the hypervisor 111 is a general technology, the detailed description of the hypervisor 111 is omitted, the hypervisor 111 is a program for enabling execution of multiple OSs 8, such as the RTOS 81 and the MMOS 82A, in parallel on the control unit 101, and has a function of managing each OS 8 or a function of assisting the communication between the respective OSs 8. However, the hypervisor 111 can also be installed as, for example, a part of the functions of the RTOS 81.

The service bus 112 is a program for exchanging data between an application layer of each OS 8 and a lower layer indicating any layer lower than the application layer. The service bus 112 includes a database for associating data used in the lower layer with data used in the application layer in order to enable the vehicle device 1 and the external device 2 to exchange data as though vehicle device 1 and the external device 2 are one device.

The service bus 112 can convert a data format between the application layer and the lower layer by referring to the database, and enables the exchange of the data between the RTOS 81 and the MMOS 82A in the vehicle device 1 and between the vehicle device 1 and the external device 2.

The firewall 113 has a function of restricting unauthorized access between the respective OSs 8, unauthorized access to the RTOS 81 or MMOS 82A from the outside, or the like. Whether to install the firewall 113 can be selected as appropriate, and when security can be ensured by another method, a configuration can also be adopted in which the firewall 113 is not installed.

The RTOS 81 is suitable for executing a process that requires a real-time property, and mainly executes a process related to vehicle control or safety, and the like. The MMOS 82A is a general-purpose device used in, for example, the general mobile terminal 7, and is suitable for executing a multimedia process. In the present embodiment, the MMOS 82 executes, for example, a display process on the screen.

However, without being limited to the process suitable for each OS 8, for example, each OS 8 can execute a display process on the meter display 302 that requires a quick response in the RTOS 81, or can execute a process, such as outputting the warning sound for safety in the MMOS 82.

An application 9 or various functional units are installed on these OSs 8. Each application 9 is a program executed on each OS 8 to implement the function provided when the vehicle is used. However, in FIG. 2, some of the applications 9 or the functional units installed on each OS 8 are extracted and illustrated, and the applications 9 or the functional units other than the applications 9 or the functional units illustrated in FIG. 2 can be installed on each OS 8.

The vehicle device 1 and the external device 2 do not always have to install all the applications 9 or the functional units illustrated in FIG. 2, and need only install the application 9 or the functional unit required according to specifications. Hereinafter, the application 9 is also simply referred to as an application. The vehicle device 1 and the external device 2 can update or newly acquire the application 9 by OTA via the mobile terminal 7, for example. The OTA is an abbreviation for Over The Air.

For example, a meter application 901, an HUD application 902, and a camera application 903 are installed on the RTOS 81 as the applications 9. The HUD is an abbreviation for Head Up Display. The meter application 901 executes a process for controlling display on the meter display 302, and for example, executes a process for generating an image of a speedometer, a warning light, or the like displayed on a meter display.

The HUD application 902 executes a process for controlling display on the head-up display 303, and for example, executes a process for generating an image or information displayed on the head-up display 303. The camera application 903 executes a process for controlling display of the image captured by the camera 306, and executes a process for detecting the object present in the image, a process for generating the guide lines for guiding the vehicle in a case of backing up, a process for synthesizing images, or the like.

An HMI processing unit 11, a determination unit 12, a data management unit 13, and a selection unit 14 are also installed on the RTOS 81 as the functional units. The HMI is an abbreviation for Human Machine Interface. These functional units are implemented by software in the present embodiment. However, a part or all of the respective functional units can be installed on the MMOS 82A, or a configuration can also be adopted in which a part or all of the respective functional units are implemented by hardware.

The HMI processing unit 11 executes a process for controlling displays on the center display 301, the meter display 302, the head-up display 303, and the air conditioner display 304 based on the data input from the peripheral device 3 or another application 9. The HMI processing unit 11 also executes a process for controlling speech output from the speaker 305 based on input data, and the like.

The determination unit 12 executes a process for determining whether the external device 2 is connected in a state of being capable of executing the function. As will be described below, the determination unit 12 communicates with the external device 2 and grasps a connection state or an operation state of the external device 2 to determine whether the external device 2 is connected in the state of being capable of executing the function. In other words, the determination unit 12 executes a process for determining whether the external device 2 is in a usable state. Although the details will be described in another embodiment, the determination unit 12 also executes a process for selecting whether to use the external device 2.

Although the details will be described in another embodiment, the data management unit 13 executes a process for enabling the use of the data stored in the external device 2. Specifically, the data management unit 13 executes a process related to erasure or migration of the data used by the external device 2, and enables the selection of whether to use the data stored in the external device 2 together with the selection unit 14.

Although the details will be described in another embodiment, the selection unit 14 executes, for example, a process for selecting whether to use the external device 2 itself, a process for selecting whether to use the function executable by the external device 2, a process for selecting to use the data of any of the vehicle device 1 and the external device 2, a process of selecting to use the function related to the HMI, and a process related to the selection of whether to use the external device 2.

For example, a radio application 904, an air conditioner application 905, a navigation application 906, a speech recognition application 907, and the like are installed on the MMOS 82A. The radio application 904 executes a process for listening to a radio broadcast, such as a process for outputting speech based on the radio broadcast signals received by the tuner 309, or changing the reception frequency according to the operation of the user.

The air conditioner application 905 executes a process related to control of the air conditioner installed in the vehicle. The navigation application 906 executes a process for displaying a current position of the vehicle based on position information and the like detected by the position detection device 308, or a process for providing a so-called navigation function for guiding a route from the current position to a destination. The speech recognition application 907 executes a process for recognizing the speech detected by the microphone 307, a process for performing a response based on the recognition result, and the like.

For example, an external device communication application 908 is installed on the MMOS 82B of the external device 2. The external device communication application 908 transmits and receives data to and from the mobile terminal 7 by wireless communication using the wireless communication device 203, executes a process for transmitting the received data to the vehicle device 1, a process for transmitting the data from the vehicle device 1 to the mobile terminal 7, or the like. Although one application 9 is illustrated in FIG. 2 for the sake of simplicity of description, the other application 9 can be installed on the external device 2.

In the present embodiment, the external device 2 performs display on the display or speech output from the speaker 305 via the vehicle device 1, and also receives the input of the operation of the user, such as execution or stop of the function via the vehicle device 1. Therefore, even when the external device 2 is connected and the function is executed by the external device 2, it seems to the user that the function is added to the vehicle device 1.

As described above, it is premised that the external device 2 is used by being connected to the vehicle device 1, and the OS 8 or the application 9 installed on the external device 2 can also cooperate with the vehicle device 1, for example, can respond to the check of the function from the vehicle device 1, and the like.

Next, an action of the above-described configuration will be described. As described above, when the multiple OSs 8 are installed on the vehicle device 1, the RTOS 81 suitable for the process that requires the real-time property and the MMOS 82 suitable for the multimedia process may be installed. In this case, as the MMOS 82, the OS 8 used in the general mobile terminal 7 and the like may be used.

Such an MMOS 82 is updated relatively frequently, and it is assumed that the required hardware performance also increases as the installed function is also expanded by the update. However, it is difficult to take action to update the hardware of the vehicle device 1 installed in the vehicle, for example, every year or every few years after shipment, and it is assumed that it is difficult to take action to update the MMOS 82 or expand the function.

Therefore, the vehicle device 1 of the present embodiment has a configuration in which, even after the shipment, by enabling adding a new function or improving the processing speed of the existing function, it is possible to easily improve the performance, such as expansion of the function provided via the vehicle device 1 in terms of hardware and software.

First, an outline will be described. The vehicle device 1 includes the connection portion 5 to which the external device 2 is connected, and the determination unit 12 that determines whether the external device 2 is connected in the state of being capable of executing the function. The external device 2 includes the module-side control unit 201 that can execute the function provided when the vehicle is used.

In other words, the vehicle device 1 is configured to use the external device 2 connected to the connection portion 5 in addition to the control unit 101 provided in the vehicle device 1 when the function is provided. Therefore, the vehicle device 1 can substantially ensure new resources in terms of hardware that can be used when the function is provided.

Since the vehicle device 1 and the external device 2 are communicably connected to each other via the connection portion 5, the vehicle device 1 and the external device 2 can be easily connected to each other even after the vehicle device 1 is attached to the vehicle. Accordingly, for example, the external device 2 can be easily connected after the shipment, and the performance of the vehicle device 1 can be easily improved. In this case, when a configuration is adopted in which the vehicle device 1 and the external device 2 are connected to each other by the USB as in the present embodiment, the connection itself can be easily performed.

In the present embodiment, the external device 2 is equipped with, for example, the external device communication application 908, which is not provided in the vehicle device 1, and can access the peripheral devices 3 via the vehicle device 1. In this case, for example, an operation screen, an operation result, or the like of the external device communication application 908 is displayed on the display or the like.

Therefore, it seems to the user that a new function is added to the vehicle device 1. In other words, in the case where the external device 2 is connected in an operable state, the vehicle device 1 can substantially ensure new resources that can be used when the function is provided.

Next, specific processes performed by the vehicle device 1 and the external device 2 will be described. Hereinafter, the description will be given while comparing flows of the processes performed by the vehicle device 1 and the external device 2 with reference to a sequence at startup illustrating a flow of a process at the startup illustrated in FIG. 3 and a sequence at a steady state illustrating a flow of a process at a normal operation illustrated in FIG. 4. Although these processes are performed by each unit, such as the control unit 101, the data management unit 13, and the module-side control unit 201, the vehicle device 1 and the external device 2 will be described as the main bodies of the processes for the sake of simplicity of description.

Figure 3:
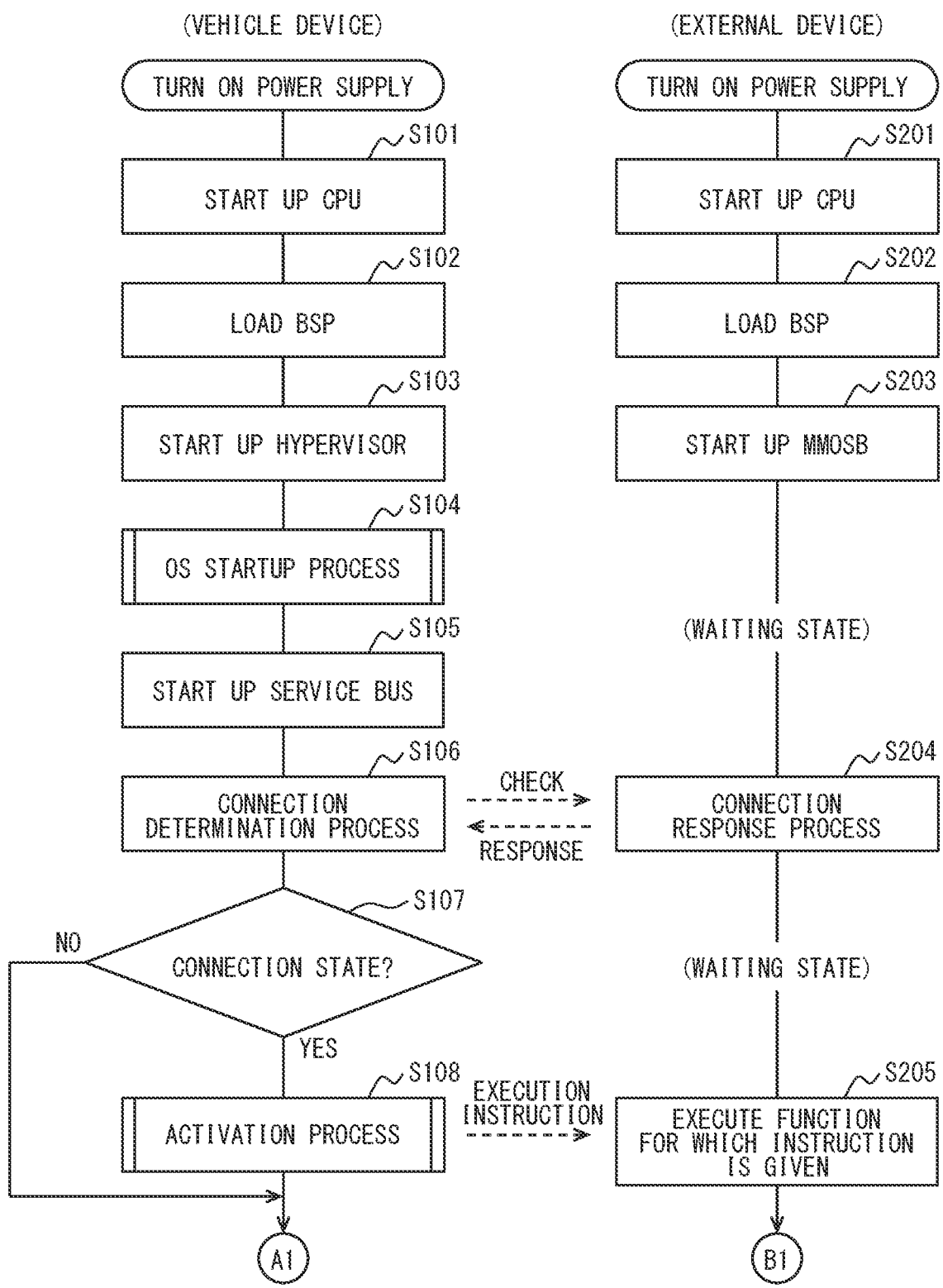
FIG. 3 is a diagram illustrating a flow of a process when the vehicle device and the external device are started up.

As illustrated in FIG. 3, when the power supply is turned on, the vehicle device 1 executes a process for starting up the CPU 104 in step S101, and loads a BSP in step S102 after the CPU 104 is started up. The BSP is an abbreviation for Board Support Package, is formed as a group of programs required for executing the OS 8 on the control unit 101, and includes a program for initializing the hardware and the like.

Figure 5:
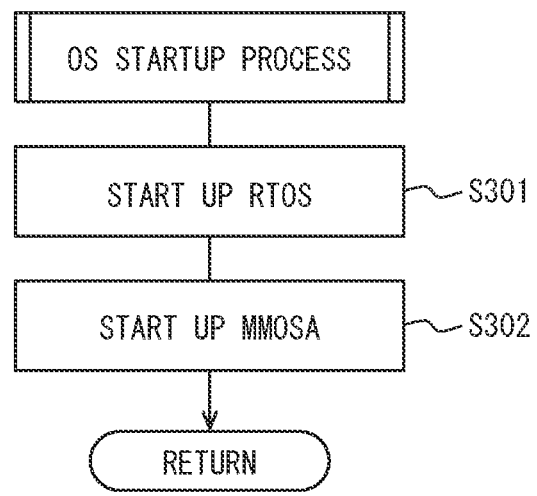
FIG. 5 is a diagram illustrating a flow of an OS startup process of the vehicle device.

When the BSP is loaded, the vehicle device 1 starts up the hypervisor in step S103, and executes an OS startup process in step S104 after the hypervisor 111 is started up. In the OS startup process, as illustrated in FIG. 5, the vehicle device 1 starts up the RTOS 81 in step S301, and then starts up the MMOS 82A in step S302.

On the other hand, as illustrated in FIG. 3, when the power supply is turned on, the external device 2 executes a process for starting up the CPU 204 in step S201, loads the BSP in step S202 after the CPU 204 is started up, and starts up the MMOS 82B in step S203. In this case, in the present embodiment, the external device 2 has higher performance and a simpler software configuration than the vehicle device 1.

Therefore, basically, it is considered that the OS 8 of the external device 2 is started up before the OS 8 of the vehicle device 1 is started up, and the OS 8 is in a waiting state of waiting for an instruction from the vehicle device 1. Thereafter, when there is a check from the vehicle device 1, the external device 2 waits for a next instruction while executing a connection response process in response to the check in step S204.

When the RTOS 81 and the MMOS 82A are started up, the vehicle device 1 starts up the service bus 112 in step S105, and then executes a connection determination process in step S106. The connection determination process is a process executed by the determination unit 12, in which it is determined whether the external device 2 is connected in the state of being capable of executing the function. Hereinafter, the state where the external device 2 is connected in the state of being capable of executing the function will be referred to as a connection state, and a state where the external device 2 is not connected to the connection portion 5 or a state where the external device 2 is connected to the connection portion 5 in a non-operable manner will be referred to as a release state.

In the connection determination process, the vehicle device 1 exchanges data for checking the connection with the external device 2, determines that the external device 2 is in the connection state when there is the response from the external device 2, and determines that the external device 2 is in the release state when there is no response from the external device 2 within a predetermined time. The data exchanged in the connection determination process can be set as appropriate.

For example, the exchanged data can include version information of the MMOS 82B, version information of the application 9 installed on the MMOS 82B, or information for specifying the provided function. Accordingly, the check of the connection state, the check of the function executable by the external device 2, the determination of whether the connected external device 2 is supported, and the like can be performed together.

In this case, when the vehicle device 1 determines that the external device 2 is in the connection state, the vehicle device 1 stores information, such as a serial number unique to the external device 2, to eliminate the need to perform re-setting or the like at the next and subsequent startup.

When there is no response from the external device 2, the vehicle device 1 determines that the external device 2 is in the release state where the function is not executable by the external device 2, NO is determined in step S107, and thus step S108 is omitted. On the other hand, when there is the response from the external device 2, the vehicle device 1 determines that the external device 2 is in the connection state where the function is executable by the external device 2, YES is determined in step S107, and thus an activation process is executed in step S108.

Figure 6:
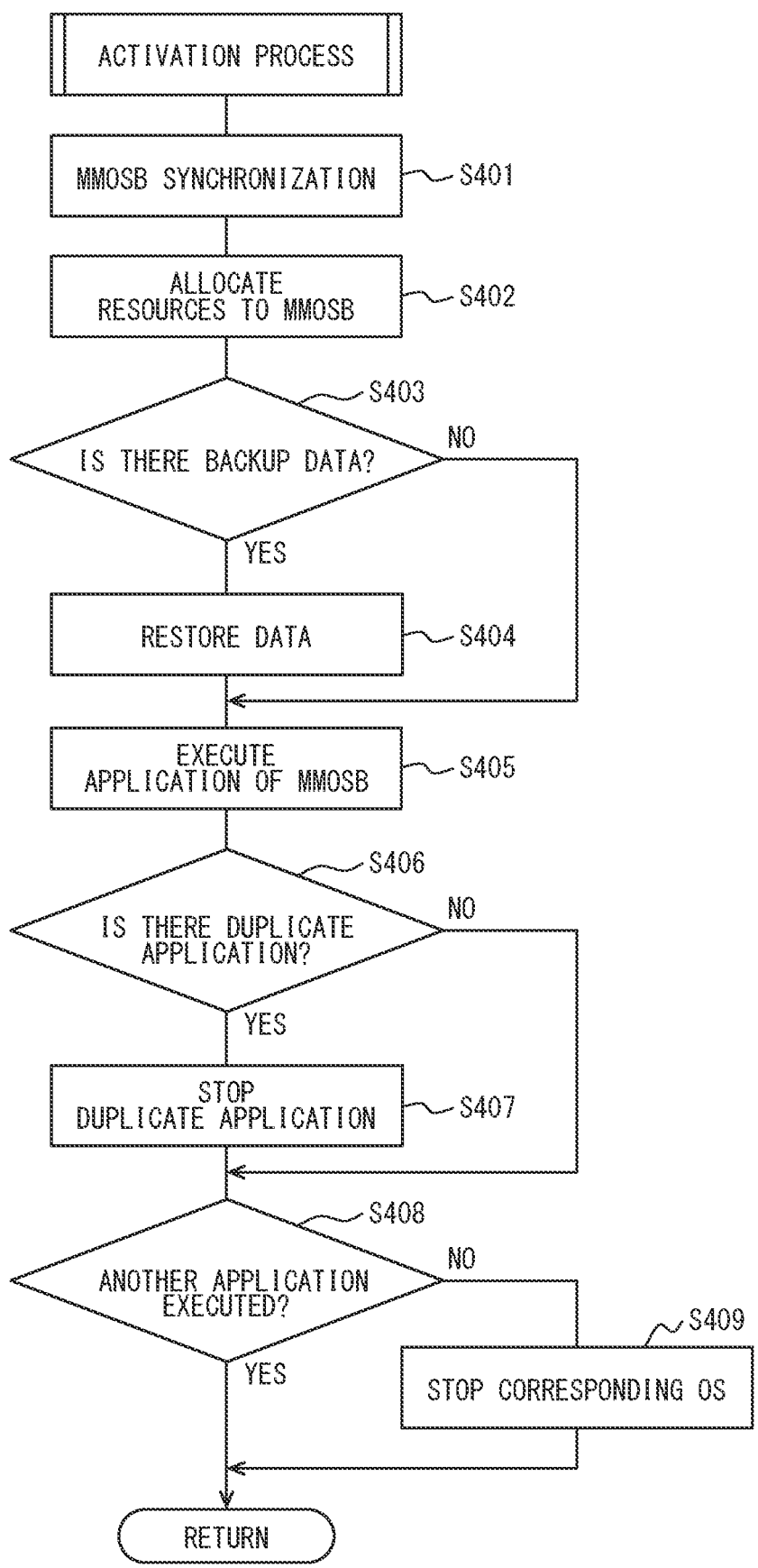
FIG. 6 is a diagram illustrating a flow of an activation process.

The activation process is a process for causing the connected external device 2 to execute the function. Specifically, as illustrated in FIG. 6, the vehicle device 1 executes a process for synchronizing with the MMOS 82B in step S401, and allocates the resources to the MMOS 82B in step S402. In step S401, a process for matching the times used by the RTOS 81, the MMOS 82A and the MMOS 82B is performed, and in step S402, a process for enabling access to the peripheral device 3 from the MMOS 82B is performed.

Subsequently, in step S403, the vehicle device 1 determines whether there is backup data. Although the details of the backup data will be described below, the data used by the external device 2 during the previous operation is backed up by the vehicle device 1. By transferring the backup data to the external device 2, the external device 2 can execute the function in the same state as before without taking time and effort for the re-setting.

Therefore, when there is the backup data, YES is determined in step S403, and thus the vehicle device 1 restores the backup data in step S404. That is, the vehicle device 1 transfers the backup data backed up by the vehicle device 1 to the external device 2 to enable the use of the backup data in the external device 2. When there is no backup data, NO is determined in step S403, and thus the vehicle device 1 omits step S404 and proceeds to the next step.

Subsequently, in step S405, the vehicle device 1 executes the application 9 of the MMOS 82B. For example, in a case of the software configuration illustrated in FIG. 2, the vehicle device 1 gives an execution instruction to the external device 2 as illustrated in FIG. 3 in order to execute the external device communication application 908. The external device 2 to which the execution instruction is given executes the external device communication application 908 by using the allocated resources, and starts providing the function using the mobile terminal 7.

Thereafter, in step S406, the vehicle device 1 determines whether there is a duplicate application. The duplicate application means the application 9 installed on the vehicle device 1 that has the duplicate function as the application 9 for which the execution instruction is given to the external device 2. The above-described determination is performed to specify the function executed by the external device 2 and stop the specified function.

In simpler terms, the duplicate application is for implementing the function that is also executable by the external device 2 among the functions that are executable by the vehicle device 1. The duplicate function includes a case where the same function can be provided by the application 9 executed by the external device 2 and a case where compatible functions can be provided.

Figure 7:
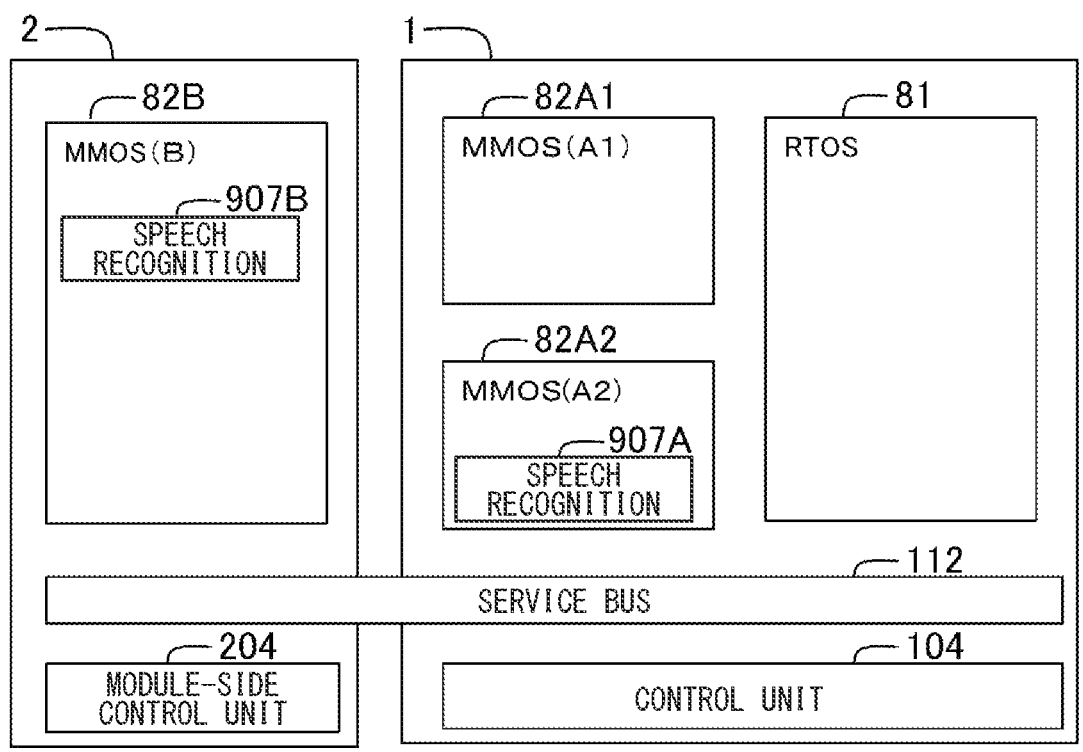
FIG. 7 is a diagram schematically illustrating a simplified software configuration example.

Hereinafter, these specific processes will be described with reference to another software configuration example illustrated in FIG. 7. First, as an example in which the same function can be provided, as illustrated in FIG. 7, for example, the RTOS 81, an MMOS 82A1, and an MMOS 82A2 are installed on the vehicle device 1, and one speech recognition application 907A is installed on the MMOS 82A2 in an executable manner. The MMOS 82B of the external device 2 is equipped with a speech recognition application 907B that can provide the same function as the speech recognition application 907A installed on the MMOS 82A2 or an upper compatible function.

The fact that the same function can be provided means that the function provided by the speech recognition application 907A can be provided by the speech recognition application 907B. In simpler terms, a configuration may be adopted in which the speech recognition application 907B is an upper compatible application 9 of the speech recognition application 907A, and the speech recognition application 907B provides a function that is not included in the speech recognition application 907A.

After starting up the RTOS 81 and then starting up multiple MMOSs 82 in order or in parallel, the vehicle device 1 grasps the presence of the speech recognition application 907B in the external device 2 in the activation process, and gives an instruction to execute the speech recognition application 907B. On the other hand, the external device 2 starts up the multiple MMOSs 82 in order or in parallel, and waits for the instruction from the vehicle device 1.

The speech recognition application 907A on the MMOS 82A2 provides the same function as the speech recognition application 907B for which the execution instruction is given to the external device 2, and thus the vehicle device 1 determines that there is the duplicate application. Therefore, YES is determined in step S406, and thus the vehicle device 1 stops the duplicate application in step S407. In step S408, the vehicle device 1 determines whether the other application 9 is executed by the MMOS 82A2 on which the duplicate application is installed.

In a case of the example of FIG. 7, since one speech recognition application 907A is installed on the MMOS 82A2, NO is determined in step S408, and thus the vehicle device 1 stops the corresponding OS 8, here, the MMOS 82A2 in step S409 and returns. However, when there is the duplicate application and the other application 9 is not executed, a configuration can also be adopted in which the duplicate application is stopped by stopping the OS 8, that is, the function is stopped by stopping the OS 8.

Next, as an example in which the compatible functions can be provided, as illustrated in FIG. 2, a configuration will be described in which the speech recognition application 907 is installed on the MMOS 82A of the vehicle device 1 and the external device communication application 908 is installed on the MMOS 82B of the external device 2. The external device communication application 908 installed on the external device 2 can access the speaker 305 or the microphone 307 via the vehicle device 1, for example, in order to enable a hands-free call.

In this case, the external device communication application 908 may be able to operate the mobile terminal 7 by speech, such as starting or terminating a call or calling up a telephone directory, according to speech input from the microphone 307. In other words, the external device communication application 908 may include a speech recognition function of recognizing speech input from the microphone 307.

In this case, it is considered that the speech recognition function can be provided as a part of the functions of the external device communication application 908 without executing the speech recognition application 907 of the vehicle device 1 when the external device communication application 908 is executed. That is, even different applications 9 may be able to provide the compatible functions.

Therefore, when the external device 2 is caused to execute the external device communication application 908, the compatible functions are provided, and thus the vehicle device 1 determines in step S406 that the speech recognition application 907 is the duplicate application, and stops the speech recognition application 907 in step S407. Since the other application 9 is executed by the MMOS 82A, YES is determined in step S408, and thus the vehicle device 1 returns without change.

In this way, when there is a duplicate function of the function executed by the external device 2, the vehicle device 1 stops the function of the vehicle device 1 by stopping the operation of the duplicate application. When there is the duplicate function of the function executed by the external device 2, the vehicle device 1 stops the function of the vehicle device 1 by stopping the operation of the OS 8 on which the duplicate application is installed.

Figure 4:
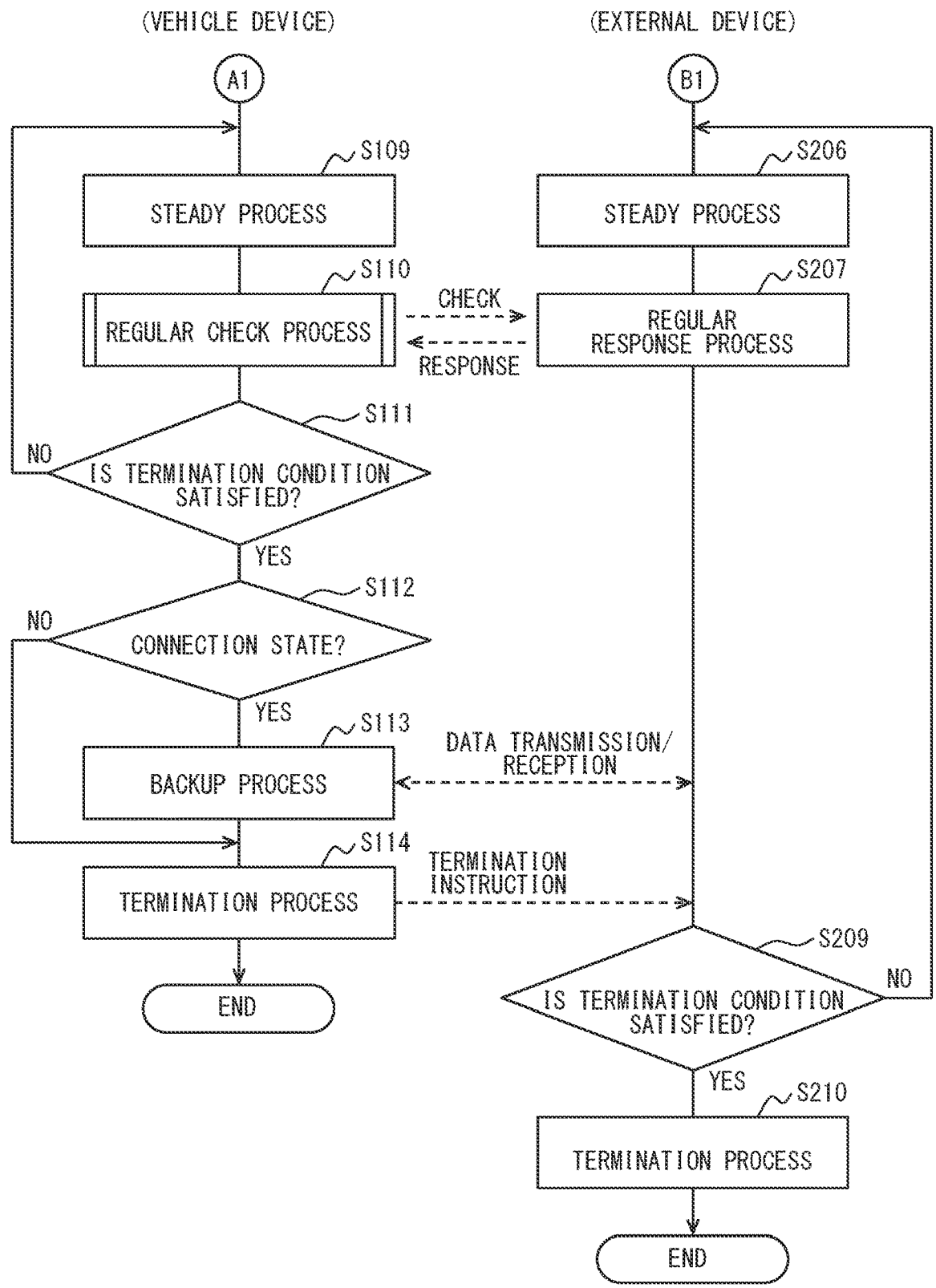
FIG. 4 is a diagram illustrating a flow of a process when the vehicle device and the external device are in a steady state.

When these series of the sequences at the startup are executed, the vehicle device 1 and the external device 2 execute the sequence at the steady state illustrated in FIG. 4. The steady state means a normal operation state. The vehicle device 1 executes a steady process in step S109. Although the specific contents of the steady process are omitted, the steady process is various processes required when the vehicle device 1 performs the normal operation, and also includes a process for providing the function.

The external device 2 repeatedly executes the steady process including various processes including, for example, execution of the external device communication application 908 in step S206, a regular response process for responding to a regular check from the vehicle device 1 in step S207, and the like until a predetermined termination condition is satisfied. In the present embodiment, as the termination condition of the external device 2, notification of a termination instruction from the vehicle device 1 and a decrease in a power supply voltage are assumed.

The vehicle device 1 executes a regular check process in step S110. The regular check process includes a process for checking whether the external device 2 is in the connection state, and a process for backing up the data from the external device 2 in the connection state, and is repeated regularly in a period during the vehicle device 1 performs the normal operation. The period during which the vehicle device 1 performs the normal operation means a period until it is determined in step S111 to be described below that the termination condition is satisfied, that is, a period until the vehicle device 1 terminates the operation.

Figure 8:
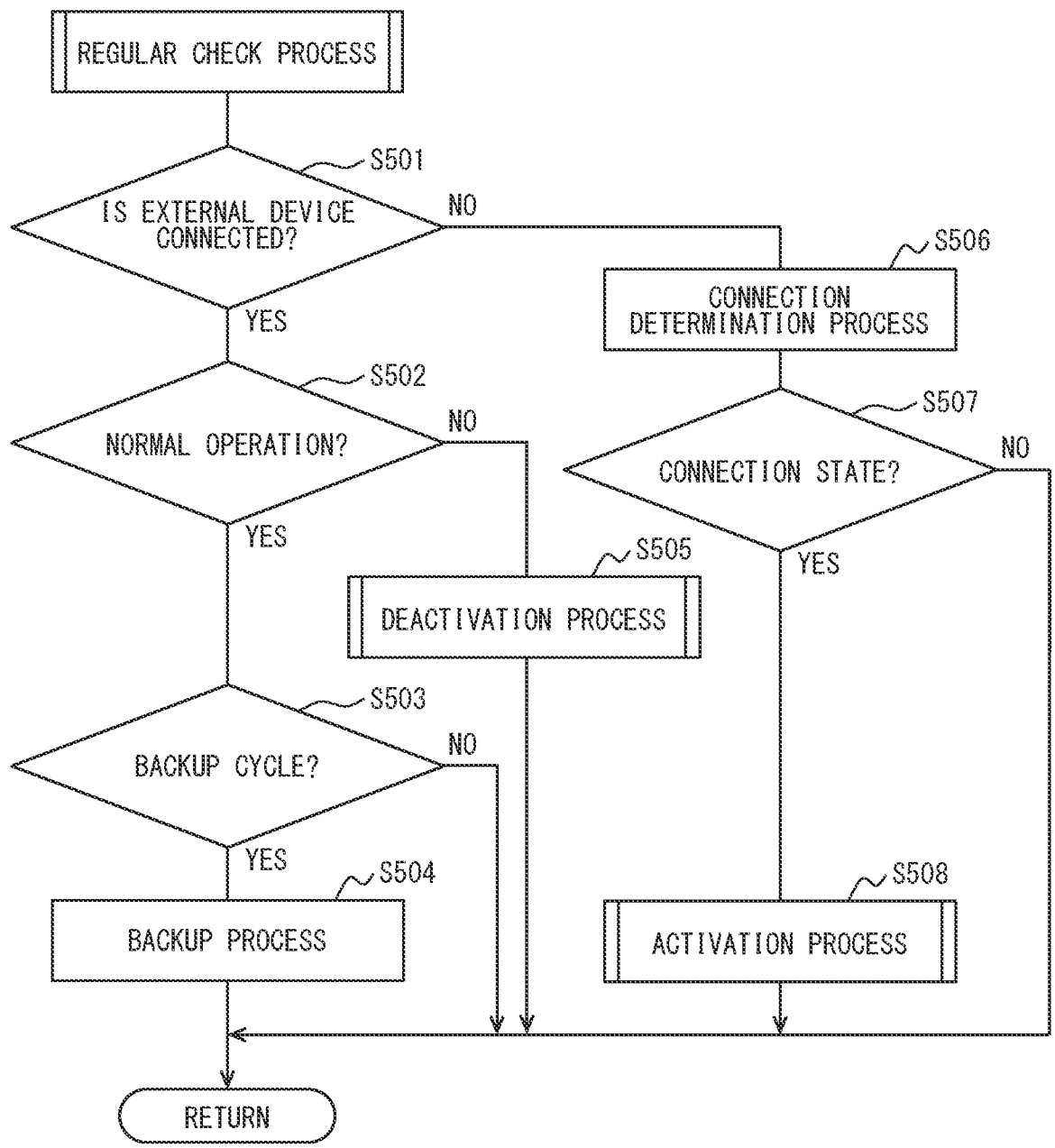
FIG. 8 is a diagram illustrating a flow of a regular check process.

In the regular check process, the vehicle device 1 determines in step S501 whether the external device 2 is connected, as illustrated in FIG. 8. In this case, the vehicle device 1 determines whether the external device 2 is connected, regardless of a state of the external device 2 checked in the sequence at the startup. The reason is that it is considered that the external device 2 is connected below during the operation of the vehicle device 1 or the external device 2 in the connection state is removed for some reasons.

When the vehicle device 1 determines that the external device 2 is connected, Yes is determined in step S501, and thus the vehicle device 1 determines in step S502 whether the external device 2 operates normally. The reason is that there is probability that the operation of the external device 2 malfunctions for some reasons during the operation of the vehicle device 1.

When the vehicle device 1 determines that the external device 2 operates normally, Yes is determined in step S502, and thus the vehicle device 1 determines in step S503 whether a backup cycle comes. The backup cycle is set in advance. When the backup cycle comes, YES is determined in step S503, and thus the vehicle device 1 executes a backup process in step S504. The backup process is mainly executed by the data management unit 13.

In the backup process, the data is transmitted and received between the vehicle device 1 and the external device 2, and in the present embodiment, the data used by the external device 2 is stored in the storage unit 110 of the vehicle device 1. The data stored in this case corresponds to the backup data, and the backup data is retained even in a state where the power supply of the vehicle device 1 is turned off.

The backup data includes, for example, data used by the MMOS 82B, data used by the application 9 operating on the MMOS 82B, or the like. The backup data also includes information, such as the type of the application 9 operating on the external device 2. That is, the vehicle device 1 is configured to specify the application 9 executed by the external device 2. The backup data is restored in the external device 2 as described above, thereby enabling the external device 2 to provide the function using the same data as before.

On the other hand, when the vehicle device 1 determines that the external device 2 does not operate normally even in the connection state, NO is determined in step S502, and thus the vehicle device 1 executes a deactivation process in step S505. In simpler terms, the deactivation process is a process for releasing the software connection between the vehicle device 1 and the external device 2 to make the external device 2 removable without affecting the vehicle device 1.

Figure 9:
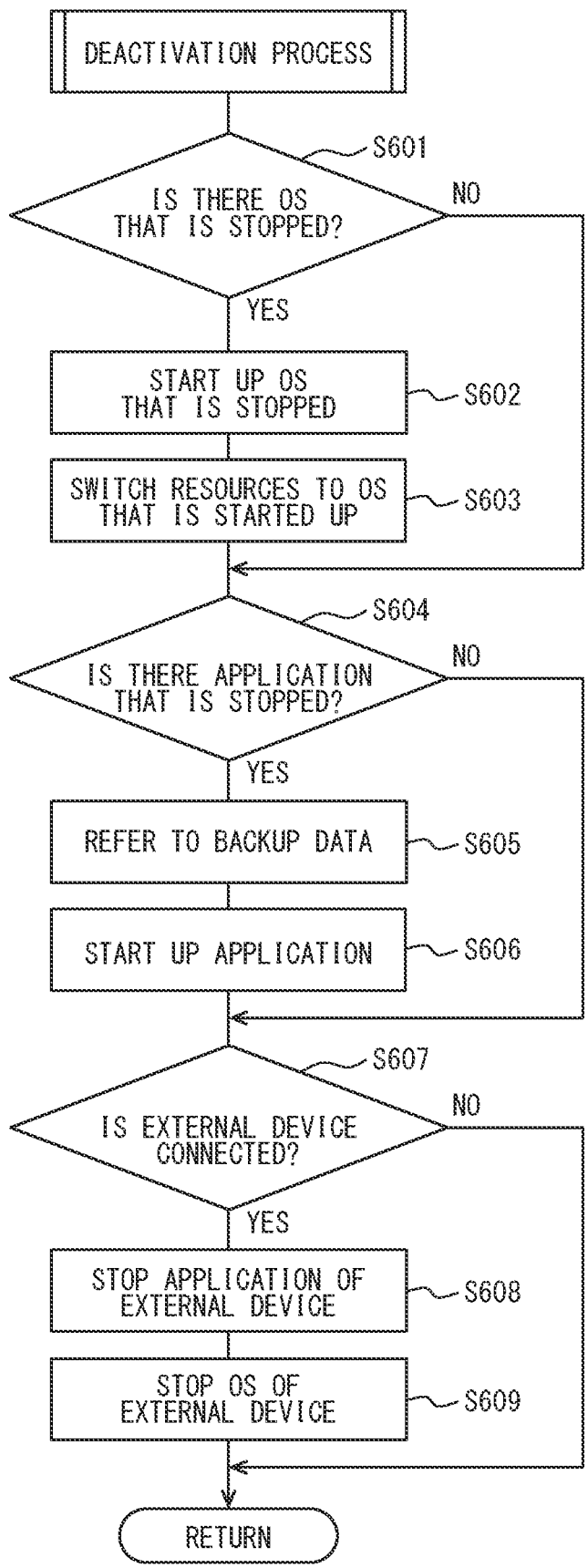
FIG. 9 is a diagram illustrating a flow of a deactivation process.

First, as illustrated in FIG. 9, the vehicle device 1 determines in step S601 whether there is the OS 8 that is stopped. For example, in the configuration example of FIG. 7 described above, the MMOS 82A2 is stopped in the activation process. Therefore, the vehicle device 1 determines that the MMOS 82A2 is not started up, YES is determined in step S601, and thus the vehicle device 1 starts up the MMOS 82A2 that is stopped in step S602. That is, the vehicle device 1 establishes the environment for implementing the function again.

In step S603, the vehicle device 1 switches the resources allocated to the MMOS 82B of the external device 2, for example, to the MMOS 82A2, of the vehicle device 1, which is stopped. Accordingly, the peripheral device 3 can be accessed from the MMOS 82A2 is possible.

Alternatively, in the configuration example of FIG. 2 described above, the MMOS 82A is not stopped in the activation process, and thus the vehicle device 1 determines that there is no OS 8 that is stopped. In this case, YES is determined in step S601, and thus the vehicle device 1 omits steps S602 and S603 and proceeds to the next step.

By the way, in a case of deactivating the external device 2, when some functions are executed by the external device 2 so far, when the execution of the function is interrupted, the interruption may be disadvantageous to the user. When the operation of the user is required to execute the interrupted function, the usability may deteriorate or the user may feel annoyed.

Therefore, in step S604, the vehicle device 1 determines whether there is the application 9 that is stopped. That is, the vehicle device 1 determines whether there is the application 9, of the vehicle device 1, which is stopped due to the provision of the function from the external device 2. When there is the application 9 of which the execution is stopped, such as the duplicate application, or when the OS 8 that is stopped is started up the application 9 is not yet executed as described above, the vehicle device 1 determines that there is the application 9 that is stopped.

In this case, the vehicle device 1 determines YES in step S604, refers to the backup data in step S605, and uses the backup data, as required, to start up the application 9 that is stopped, in step S606. In other words, the vehicle device 1 executes the function that is stopped due to the execution by the external device 2 to restart the provision of the function, which is provided from the external device 2, from the vehicle device 1 in the same state as the function provided by the external device 2.

Accordingly, the function, which is no longer provided from the external device 2 due to the deactivation of the external device 2, can be provided from the vehicle device 1, and the function can be provided in the same state as the function provided from the external device 2 so far while referring to the backup data.

In other words, since the vehicle device 1 specifies the application 9 that is executed by the external device 2 as described above, the vehicle device 1 can also grasp the function of which the provision is stopped when the external device 2 is stopped, but does not provide the function when the function is executable by the vehicle device 1, that is, when the application 9 is not the duplicate application. When the vehicle device 1 determines that there is no application 9 that is stopped, NO is determined in step S604, and thus the vehicle device 1 omits steps S605 and S606 and proceeds to the next step.

Thereafter, the vehicle device 1 determines in step S606 whether the external device 2 is connected. In this case, it is considered that the external device 2 is in the connection state when the deactivation process is called from the regular check process. However, as will be described below, the deactivation process may be executed based on an instruction from the user, a worker as a dealer, or the like, and thus the vehicle device 1 determines in step S606 whether the external device 2 is connected. That is, the vehicle device 1 re-checks the connection of the external device 2.

When the vehicle device 1 determines that the external device 2 is connected, YES is determined in step S606, and thus the vehicle device 1 stops the application 9 of the external device 2 in step S607, stops the OS 8 of the external device 2 in step S608, and returns. On the other hand, when the vehicle device 1 determines that the external device 2 is not connected, NO is determined in step S606, and thus the vehicle device 1 omits the processes of steps S607 and S608 and returns.

When the vehicle device 1 determines that the external device 2 is not connected in the regular check process, NO is determined in step S501, and thus the vehicle device 1 executes a connection determination process in step S506. The above-described configuration is based on the assumption that the external device 2 is connected while the vehicle device 1 operates, as described above. In the connection determination process, it is determined whether the external device 2 is connected, as in step S106. In this case, the vehicle device 1 also acquires information for specifying the type of the application 9 executed by the external device 2.

When the vehicle device 1 determines that the external device 2 is in the connection state, YES is determined in step S507, and thus the vehicle device 1 executes the activation process in step S508. Accordingly, it is possible to use the external device 2 or to cause the external device 2 to execute the function. On the other hand, when the vehicle device 1 determines that the external device 2 is not in the connection state, NO is determined in step S507, and thus the vehicle device 1 omits step S508 and returns.

As described above, the vehicle device 1 regularly checks the connection state of the external device 2 and whether the external device 2 operates normally in the normal operation, and regularly backs up the data used by the external device 2 when the external device 2 operates normally. In this case, the vehicle device 1 can be configured to regularly back up at predetermined time intervals. The vehicle device 1 can be configured to regularly back up at a predetermined time.

As illustrated in FIG. 4, in step S111, the vehicle device 1 determines whether the termination condition is satisfied, and repeatedly executes the steady process and the regular check process until the termination condition is satisfied. In the present embodiment, as the termination condition, input of a stop operation with respect to the vehicle device 1 by the user and the decrease in the power supply voltage with respect to the vehicle device 1 are assumed. As a situation where the power supply voltage decreases, a case where the power supply is cut off due to some types of trouble when the user turns off an accessory power supply.

When the vehicle device 1 determines that the termination condition is not satisfied, NO is determined in step S111, and thus the vehicle device 1 repeats the steady process and the regular check process. On the other hand, when the vehicle device 1 determines that the termination condition is satisfied, YES is determined in step S111, and thus the vehicle device 1 determines in step S112 whether the external device 2 is in the connection state.

When the vehicle device 1 determines that the external device 2 is in the connection state, YES is determined in step S112, and thus the vehicle device 1 executes the backup process in step S113, executes a termination process in step S114, and terminates the process. In the termination process, the stop of the application 9, a shutdown process of the OS 8, or the like is performed, and the notification of the termination instruction is given to the external device 2.

The external device 2 determines in step S209 whether the termination condition is satisfied, and when the external device 2 determines that the termination condition is not satisfied, NO is determined in step S209, and thus the external device 2 repeatedly executes the steady process or the regular response process to provide the function. On the other hand, when the external device 2 determines that the termination condition is satisfied, YES is determined in step S209, and thus the external device 2 executes the termination process, such as the stop of the application 9 or the shutdown process of the OS 8, to terminate the process.

As described above, the vehicle device 1 determines whether the external device 2 is connected to the connection portion 5 in the state of being capable of executing the function, and when the vehicle device 1 determines that the external device 2 is connected in the state of being capable of executing the function, the vehicle device 1 enables the provision of the function by causing the external device 2 to execute the application 9, and for example, stops the duplicate application in the present embodiment.

With the vehicle device 1 described above, following effects can be obtained. The vehicle device 1 includes the control unit 101, the connection portion 5 to which the external device 2 is connected, and the determination unit 12, and when the vehicle device 1 determines that the external device 2 is connected in the state of being capable of executing the function, the vehicle device 1 activates the external device 2 to enable the execution of the function, and stops at least one function among the functions that are executable by the vehicle device 1.

Accordingly, for example, in a situation where, although the vehicle has the required performance at the time of shipment, a subsequent update of the OS 8 requires higher performance, it is possible to easily improve the performance for providing the function by connecting the external device 2.

In the case where the external device 2 is used to improve the performance, the power consumption increases when the duplicate function is executed, but the power consumption is reduced by the vehicle device 1 stopping at least one among the functions of the vehicle device 1. Accordingly, an excessive increase in power consumption due to the improved performance can be reduced.

The vehicle device 1 stops a duplicate function of the function executed by the external device 2 among the functions that are executable by the vehicle device 1. Accordingly, it is possible to prevent a loss of the function, that is, to prevent the function that can be provided from being no longer provided. By stopping the duplicate function, it is possible to reduce an excessive increase in power consumption.

The vehicle device 1 stops the function by stopping the operation of the application 9 that implements the function. Accordingly, it is possible to easily stop the function, and it is also easy to restart the provision of the function.

The vehicle device 1 stops the function by stopping, for example, the operation of the OS 8, such as the MMOS 82A, on which the application 9 that implements the function is installed. Accordingly, it is possible to easily stop the function, and it is also easy to restart the provision of the function. Since the resources allocated to the OS 8 can be reduced, the load can be reduced.

When the vehicle device 1 determines that the external device 2 is no longer in the state of being capable of executing the function during the operation, the vehicle device 1 executes the function, of the vehicle device 1, which is stopped due to the execution by the external device 2. Accordingly, the loss of the function can be prevented. By referring to the backup data as in the embodiment, the function can be provided in the same state as the function provided by the external device 2.

The vehicle device 1 repeatedly determines whether the external device 2 is in the state of being capable of executing the function during the operation of the vehicle device 1. Accordingly, even when the connection with the external device 2 is released for some reasons or the external device 2 breaks down, it is possible to prevent the loss of the function.

The vehicle device 1 includes the control unit 101, the connection portion 5 to which the external device 2 is connected, and the input unit 10 for inputting the operation, and backs up the data used by the external device 2 when an operation of removing the external device 2 is input. Accordingly, first, by connecting the external device 2, it is possible to easily improve the performance for providing the function.

By backing up the data used by the external device 2, the function can be executed in the same environment when the external device 2 is connected next and subsequent times. Even when the connection of the external device 2 is unintentionally released, the function is executable in the same environment by the vehicle device 1 using the backup data.

When the external device 2 is connected, the vehicle device 1 regularly backs up the data used by the external device 2. Accordingly, for example, when the connection of the external device 2 is unintentionally released, the function that is executed by the external device 2 so far can be executed in the same environment by the vehicle device 1, and a function failure can be avoided.

The vehicle device 1 can be configured to back up the data when the data of the external device 2 is updated, in addition to the configuration of regularly backing up the data as in the embodiment. In this case, for example, in the regular check process illustrated in FIG. 4, the update of the data can be grasped by monitoring the update of the data by the OS 8 via the service bus 112 or giving notification of the update by the application 9 that updates the data.

The vehicle device 1 can back up the data each time the data is updated, or can back up the data at any timing, such as when there is time to spare in the process after grasping that the data is updated.

When the external device 2 is connected, the vehicle device 1 transfers the backed up data to the external device 2. Accordingly, the function can be executed in the same environment as before without requiring the operation by the user, such as setting.

The vehicle device 1 includes the control unit 101, the connection portion 5 to which the external device 2 is connected, and the determination unit 12, and executes the function, which is executed by the external device 2, by the vehicle device 1 when the vehicle device 1 determines that the external device 2 is not in the state of being capable of executing the function. For example, when the connection of the external device 2 is unintentionally released, the function that is executed by the external device 2 so far is executable by the vehicle device 1 in the same environment, and the function failure can be avoided.

When the vehicle device 1 determines that the external device 2 is not in the state of being capable of executing the function, the vehicle device 1 executes the function, of the vehicle device 1, which is stopped due to the execution by the external device 2. In the example of the embodiment, the function implemented by the duplicate application corresponds to the function, of the vehicle device 1, of which the operation is stopped when the function is executed by the external device 2. Accordingly, it is possible to continue the provision of the function without incurring the function failure, such as the stop of the function that is provided so far.

The vehicle device 1 executes the function by starting up the application 9, of the vehicle device 1, of which the operation is stopped when the function is executed by the external device 2. In the example of the embodiment, the duplicate application corresponds to the application 9, of the vehicle device 1, of which the operation is stopped when the function is executed by the external device 2. Accordingly, it is possible to continue the provision of the function without incurring the function failure, such as the stop of the function that is provided so far.

The vehicle device 1 executes the function by starting up the operating system, of the vehicle device 1, of which the operation is stopped when the function is executed by the external device 2. In the example of the embodiment, the MMOS 82A2 illustrated in FIG. 7 corresponds to the operating system, of the vehicle device 1, of which the operation is stopped when the function is executed by the external device 2. Accordingly, it is possible to continue the provision of the function without incurring the function failure, such as the stop of the function that is provided so far.

The vehicle device 1 repeatedly determines whether the external device 2 is in the state of being capable of executing the function during the operation. Accordingly, for example, when the connection of the external device 2 is unintentionally released, it is possible to reduce a case where the function that can be provided is no longer provided.

When the vehicle device 1 is connected to the external device 2, the vehicle device 1 enables the external device 2 to use the data stored in the vehicle device 1. The function can be executed in the same environment as before without requiring the operation by the user, such as setting.

When the data stored in the external device 2 is updated, the vehicle device 1 backs up the data in the vehicle device 1. Accordingly, for example, even when the connection of the external device 2 is unintentionally released, the latest data is backed up, and thus the same environment as before can be easily reproduced.

In the embodiment, the example has been illustrated in which the vehicle device 1 and the external device 2 are physically communicably connected to each other by the USB connection as the service bus 112, but the service bus 112 is not limited to the communication by the USB connection, and the vehicle device 1 and the external device 2 need only be communicably connected to each other. For example, by adopting a wireless communication circuit as the connection portion 5, a configuration can be adopted in which the vehicle device 1 and the external device 2 are communicably connected to each other without physical connection.

In the embodiment, the example has been illustrated in which the connection state of the external device 2 is determined by the communication, but a configuration can be adopted in which a authentication function of the external device 2 is provided in the vehicle device 1 in order to determine whether the external device 2 is connected or whether the mobile terminal 7 on which the similar MMOS 82 is installed is connected. Accordingly, the same effects as in the embodiment can be obtained, for example, the risk of erroneously recognizing the mobile terminal 7 on which the similar MMOS 82 is installed, as the external device 2, can be reduced, and the performance of the vehicle device 1 can be easily improved.

In the embodiment, the example has been illustrated in which the hypervisor 111 is installed independently from each OS 8, and each OS 8 is operated on the hypervisor 111, but another configuration can be adopted. For example, when the RTOS 81 has the function of the hypervisor 111, a configuration can also be adopted in which the RTOS 81 is started up first, the function of the hypervisor 111 is activated, and then the MMOS 82A is executed on the RTOS 81.

Figure 10:
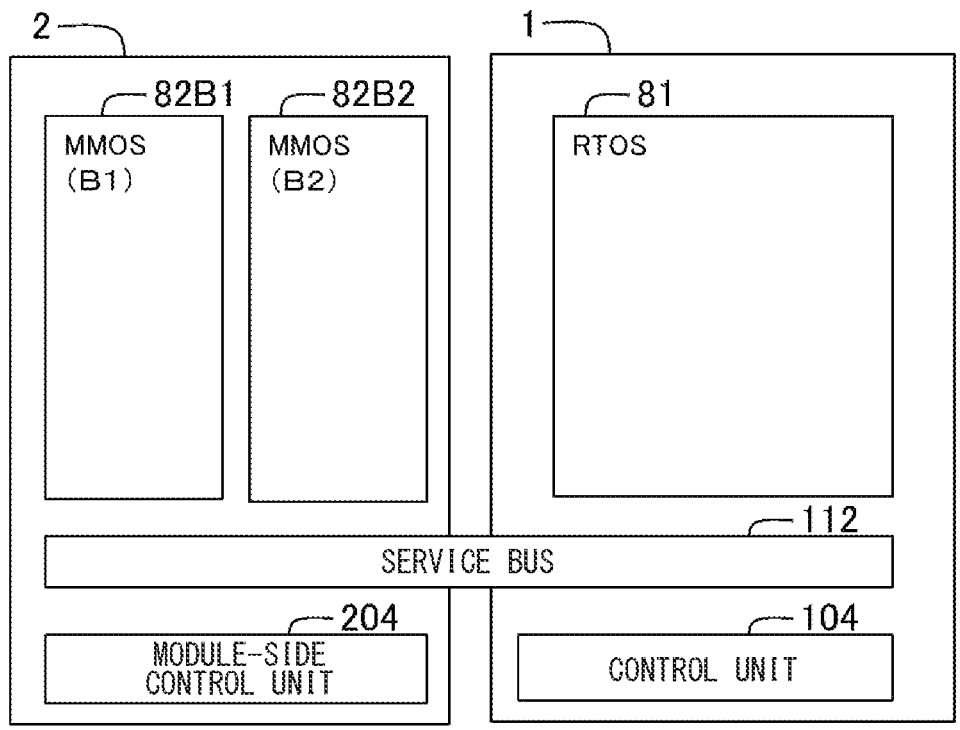
FIG. 10 is a diagram schematically illustrating another software configuration example.

In the embodiment, the software configuration example has been illustrated in which the multiple OSs 8 are installed on the vehicle device 1 and one OS 8 is installed on the external device 2, but another software configuration can be adopted. For example, as illustrated in FIG. 10, a configuration can be adopted in which one RTOS 81 is installed on the vehicle device 1, and the multiple OSs 8, such as the MMOS 82B1 and the MMOS 82B2, are installed on the external device 2.

A configuration can be adopted in which the firewall 113 is not provided. Even with such a configuration, by stopping the application 9 of the vehicle device 1 when providing the function from the external device 2, the same effects as in the embodiment can be obtained, for example, the performance of the vehicle device 1 can be easily improved, and the power consumption can be reduced.

In the embodiment, the example has been illustrated in which the data is backed up by storing the data in the storage unit 110 of the vehicle device 1, but a configuration can be adopted in which the data is, for example, stored in an external storage medium, such as a memory card, stored in the mobile terminal 7, or stored in a server on a network that is communicably connected via the mobile terminal 7. That is, a configuration can be adopted in which the storage unit 110 is provided in the vehicle device 1 or is provided outside the vehicle device 1.

Various effects described above can be obtained in the same manner even with the vehicle system 4 including the vehicle device 1 and the external device 2, for example, the performance in a situation where high performance is required can be easily improved, and an excessive increase in power consumption due to the improved performance can be reduced.

Second Embodiment

Hereinafter, a second embodiment will be described. In the second embodiment, handling of the data in each device will be described. Since a part of the configurations or the processes of the vehicle device 1 and the external device 2 are common to other embodiments, the description will be made with reference to the drawings of the other embodiments.

The external device 2 uses various data when the function is provided. The external device 2 can also store the user information transmitted from the vehicle device 1 as described in the first embodiment. Although these data are basically stored in the module-side storage unit 210 of the external device 2, these data are also backed up by the vehicle device 1 as described in the first embodiment.

Since the external device 2 can be connected to the vehicle device 1, the external device 2 can be removed from the vehicle device 1. As a situation where the user or the worker as the dealer intentionally removes the external device 2 from the vehicle device 1, a case where the external device 2 is replaced with a newer external device 2 or a case where the external device 2 is attached to another vehicle device 1 is considered. In this case, in the former case, the vehicle device 1 is the same and the external device 2 is updated, and in the latter case, the external device 2 is the same and the vehicle device 1 is updated.

However, it is desirable to change the handling of the data stored in the external device 2 between the former case and the latter case. The reason is that, since the data used in the vehicle equipment, the data used in the provided function, or the like is stored in the vehicle device 1, and the data used by the external device 2 is also backed up, for example, in the former case, it is assumed that the removed external device 2 is not used thereafter. In other words, in the former case, it is considered that there is little need to leave the data in the external device 2.

On the other hand, in the latter case, when the migration of the user information to the new vehicle device 1 can be performed without change, re-setting, re-inputting of the data, or the like is not required, and thus the migration is considered to be advantageous to the user. In other words, in the latter case, it is considered desirable to leave the data in the external device 2.

Therefore, when the external device 2 is intentionally removed, the vehicle device 1 executes a process for performing managing to enable the selection of whether to erase the data stored in the external device 2. Although this process is basically performed by the data management unit 13, the vehicle device 1 will be described below as a main body in order to facilitate understanding. The operation of the user or the worker as the dealer can be input at any timing when the vehicle device 1 is in the normal operation state.

The vehicle device 1 receives the operation by displaying an operation menu or the like on the center display 301, for example. In this case, in relation to the present embodiment, the vehicle device 1 displays an icon for inputting an instruction to remove the external device 2, an icon or a check button for selecting whether to erase the data in that case and setting whether to perform the migration of the data of the vehicle device 1, or the like on the HMI. The display of the HMI illustrated here is merely an example, and any display on which the same instruction can be input need only be used. Hereinafter, representative removal modes will be individually described.

<Example of Erasing Data>

Figure 11:
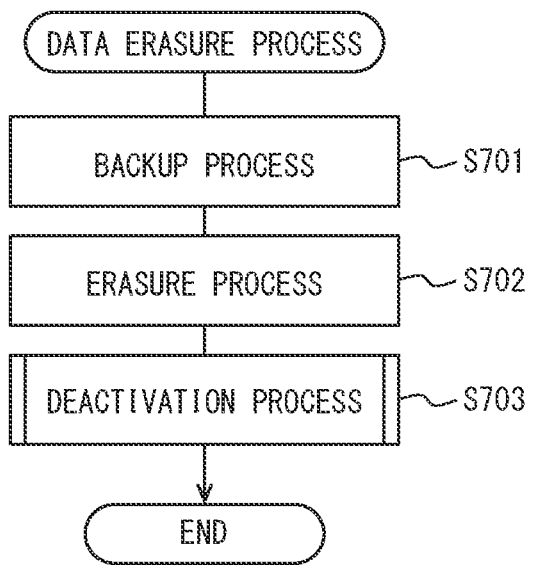
FIG. 11 is a diagram illustrating a flow of a data erasure process in a second embodiment.

When an instruction to erase the data and remove the external device 2 is input, the vehicle device 1 executes a data erasure process illustrated in FIG. 11. In the data erasure process, the vehicle device 1 executes the backup process in step S701 to back up the data of the external device 2. Subsequently, in step S702, the vehicle device 1 executes an erasure process for actually erasing the data.

In the erasure process, the vehicle device 1 erases the data stored in the module-side storage unit 210 of the external device 2 by individually erasing the designated data, collectively erasing the data by performing so-called formatting of the read-write area of the ROM, or grouping and erasing the data stored after the shipment by initializing the external device 2.

When the erasure of the data is terminated, the vehicle device 1 executes the deactivation process in step S703. Accordingly, the software connection between the vehicle device 1 and the external device 2 is released, and the external device 2 can be removed without affecting the vehicle device 1 or the backup data. Since the data of the external device 2 is erased, it is possible to reduce the risk of leakage of the user information and the like.

<Example of Migration of Data>

Figure 12:
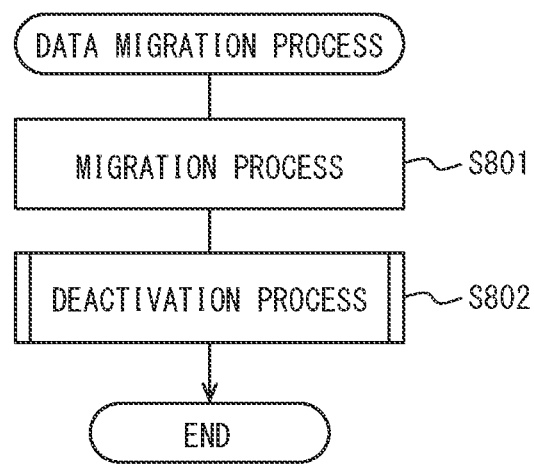
FIG. 12 is a diagram illustrating a flow of a data migration process.

When an instruction to perform the migration of the data and remove the external device 2 is input, the vehicle device 1 executes a data migration process illustrated in FIG. 12. In the data migration process, the vehicle device 1 executes a migration process for actually performing the migration of the data in step S801.

In the migration process, the vehicle device 1 performs the migration of the data stored in the storage unit 110 of the vehicle device 1 to the external device 2 by individually performing the migration of the designated data, or collectively performing the migration of the data by copying the entire read-write area of the ROM. In this case, by including information, such as a serial number unique to the vehicle device 1, in the migration data, the risk of the migration of the data to a different vehicle device 1 can be reduced.

When the migration of the data is terminated, the vehicle device 1 executes the deactivation process in step S802. Accordingly, the software connection between the vehicle device 1 and the external device 2 is released, and the external device 2 can be removed without affecting the external device 2 or the migration data. In this case, since the data is stored in the external device 2, when the external device 2 is connected to another vehicle device 1, the migration of the data from the previous vehicle device 1 to the new vehicle device 1 can be easily performed.

Therefore, in addition to the case where the user performs the migration of the data himself/herself, for example, in the case where the worker as the dealer wants to perform the migration of the data from an old vehicle device 1 to a new vehicle device 1 when where the vehicle is replaced with a new vehicle, the migration of the data, such as the user information, can be easily performed.

<Example of Removal>

Figure 13:
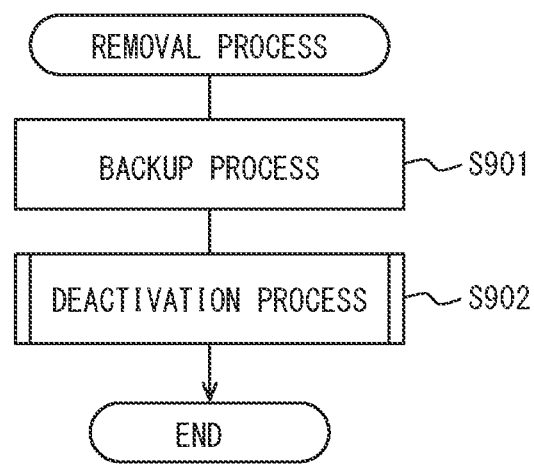
FIG. 13 is a diagram illustrating a flow of a removal process.

For example, when an instruction to simply remove the external device 2 for inspection or the like is input, the vehicle device 1 executes a removal process illustrated in FIG. 13. In the removal process, the vehicle device 1 executes the backup process in step S901, and then executes the deactivation process in step S902.

Accordingly, the software connection between the vehicle device 1 and the external device 2 is released, and the external device 2 can be removed without affecting the vehicle device 1 and the external device 2. In this case, since the data is backed up in the vehicle device 1 and the data is also stored in the external device 2, when the external device 2 is connected to the vehicle device 1 again, the external device 2 can be used in the previous state.

<Example of Transfer of Data from the External Device 2>

Figure 14:
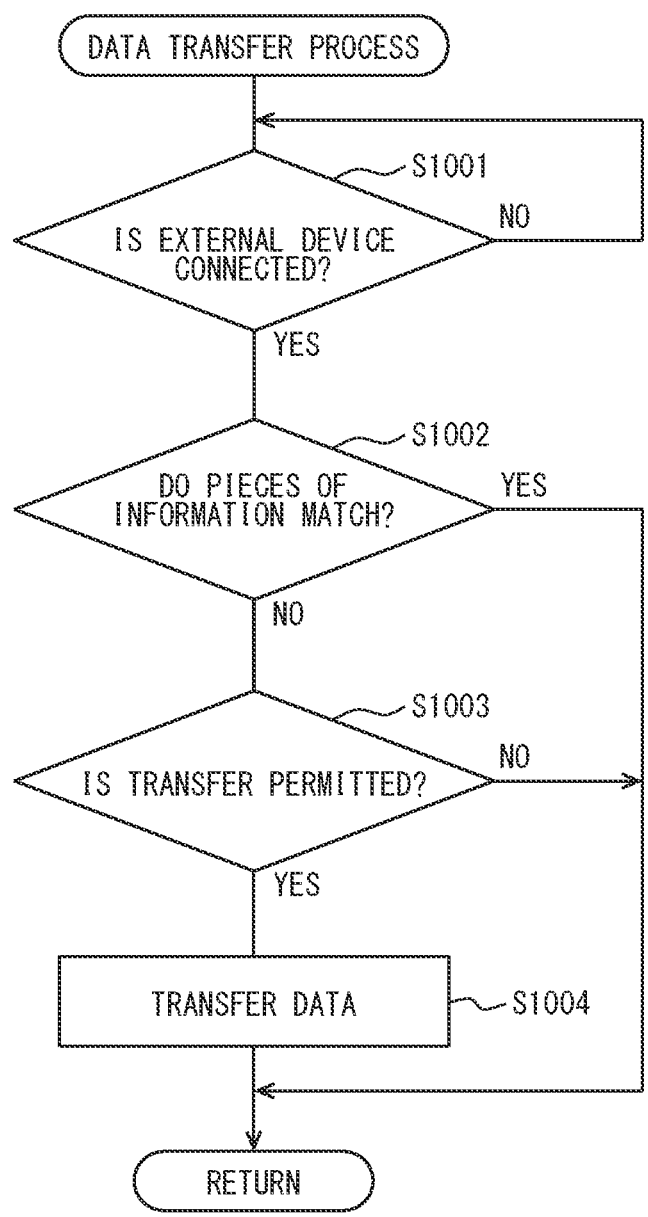
FIG. 14 is a diagram illustrating a flow of a data transfer process.

The vehicle device 1 can transfer the data stored in the external device 2 to the vehicle device 1. Specifically, the vehicle device 1 executes a data transfer process illustrated in FIG. 14, for example, after the power supply is turned on and the OS 8 is started up. In this case, the vehicle device 1 determines in step S1001 whether the external device 2 is connected.

When the vehicle device 1 determines that the external device 2 is connected, YES is determined in step S1001, and thus the vehicle device 1 determines in step S1002 whether the information unique to the connected external device 2 matches the information stored in the vehicle device 1. The information stored in the vehicle device 1 is data acquired when the external device 2 is previously connected.

When the vehicle device 1 determines that the pieces of information match, YES is determined in step S1002, and thus the vehicle device 1 returns without change. The reason is that, since the connected external device 2 is the external device 2 that is previously connected, and the data stored in the external device 2 is already stored in the vehicle device 1 by the backup or the like, it is considered that there is no need to transfer the data.

On the other hand, when the vehicle device 1 determines that the pieces of information do not match, NO is determined in step S1002, and thus the vehicle device 1 determines in step S1003 whether the transfer of the data is permitted. In this case, the permission of the user to transfer the data can be obtained by, for example, displaying a message to the effect that the data is to be transferred and an icon for selecting whether to permit the transfer on the center display 301.

When the transfer of the data is permitted, the vehicle device 1 transfers the data stored in the external device 2 to the vehicle device 1 in step S1004. For example, the vehicle device 1 overwrites the backup data stored in the vehicle device 1 with the data stored in the external device 2.

On the other hand, when the transfer of the data is not permitted, NO is determined in step S1003, and thus the vehicle device 1 returns. However, even after the data transfer process is temporarily terminated, the vehicle device 1 can execute the data transfer process at any timing, for example, when an operation of giving an instruction to transfer the data is input by the user or the worker as the dealer.

With the vehicle device 1 described above, following effects can be obtained. The vehicle device 1 includes the control unit 101, the connection portion 5 to which the external device 2 is connected, and the input unit 10 for inputting the operation, and backs up the data used by the external device 2 when an operation of removing the external device 2 is input. Accordingly, the same effects as in the first embodiment can be obtained, for example, the performance for providing the function can be easily improved by connecting the external device 2 first.

By backing up the data used by the external device 2, the function can be executed in the same environment when the external device 2 is connected next and subsequent times. Even when the connection of the external device 2 is unintentionally released, the function is executable in the same environment by the vehicle device 1 using the backup data.

When the external device 2 is connected, the vehicle device 1 transfers the backed up data to the external device 2. Accordingly, the function can be executed in the same environment as before without requiring the operation by the user, such as setting.

When the vehicle device 1 is connected to the external device 2, the vehicle device 1 enables the external device 2 to use the data stored in the vehicle device 1. The function can be executed in the same environment as before without requiring the operation by the user, such as setting.

The vehicle device 1 includes the control unit 101, the connection portion 5 to which the external device 2 is connected, and the data management unit 13 that enables the use of the data stored in the external device 2 when the external device 2 is connected to the connection portion 5. Accordingly, for example, when the vehicle is replaced with a new vehicle and the vehicle device 1 is updated, it is possible to easily perform the migration of the data by using the external device 2.

The vehicle device 1 enables the use of the data used in function provided when the vehicle is used. Accordingly, the function can be provided in the same environment as before.

The vehicle device 1 enables the use of the data used in vehicle equipment. Accordingly, the vehicle can be used in the same environment as before, for example, the migration of the data, such as the seat position or the steering wheel position, to the new vehicle can be performed. The vehicle device 1 enables the use of the data used by the peripheral device 3. Accordingly, the function can be provided in the same environment as before.

The vehicle device 1 enables the selection of whether to use the data stored in the external device 2. Accordingly, it is possible to reduce the risk that the HMI or the like is changed to an unintended state, or that the backup data is unintentionally updated.

The vehicle device 1 regularly backs up the data stored in the external device 2 to the vehicle device 1. Accordingly, in a case of the migration or the transfer of the data, the migration or the transfer of the latest data can be performed.

The vehicle device 1 erases the data stored in the external device 2 when the external device 2 is removed. Accordingly, the risk of leakage of the data can be reduced, for example, when the external device 2 is replaced with a new external device.

The vehicle device 1 stores the data, which is stored in the vehicle device 1, in the external device 2 when the external device 2 is removed. Accordingly, for example, when the external device 2 is connected to the new vehicle device 1, the same environment as before can be reproduced without requiring the operation by the user, such as setting.

Hitherto, the example has been illustrated in which the data is handled by the vehicle device 1 as a main body, but a configuration can also be adopted in which the external device 2 is provided with the module-side control unit 201 that can access the peripheral device 3 via the vehicle device 1 and executes the function, the module-side storage unit 210 that stores the data, and a data transfer unit (not illustrated) that executes a process of transferring the data, which is stored in the external device 2, to the vehicle device 1 in a case of being connected to the vehicle device 1, and the external device 2 handles the data, as a main body.

Specifically, a configuration can be adopted in which the data transfer unit displays the effect that the migration of the data is to be performed by displaying an icon or the like indicating whether to permit the transfer of the data, and updates the data stored in the vehicle device 1 when the user permits the migration. With such a configuration as well, the same effects as in the vehicle device 1 can be obtained, for example, the migration of the data to a new vehicle device 1 can be easily performed without requiring re-setting or re-inputting of data.

In this case, with a configuration in which the information of the vehicle device 1 is acquired, whether the vehicle device 1 is the vehicle device 1 to which the external device 2 is previously connected can be determined, and the risk of unintentional leakage of the data due to the data transfer to the other vehicle device 1 can be reduced. With a configuration in which the permission is requested in a case of transferring the data, the risk of leakage of the data or erroneous overwriting of the backup data of the vehicle device 1 can be reduced.

Even with the vehicle system 4 including the vehicle device 1 and the external device 2, various effects described above can be obtained in the same manner, for example, the function can be executed in the same environment when the external device 2 is connected next and subsequent times.

Third Embodiment

Hereinafter, a third embodiment will be described. In the third embodiment, processes related to the selection of whether to use the external device 2 and the selection to use which data of the vehicle device 1 and the external device 2 will be described. Since a part of the configurations or the processes of the vehicle device 1 and the external device 2 are common to other embodiments, the description will be made with reference to the drawings of the other embodiments.

For example, when a new vehicle is purchased, a situation is assumed in which the vehicle device 1 is updated to a new vehicle device 1 that matches the vehicle, while the external device 2 is not updated because the external device 2 that is used so far is applied. Hereinafter, in the vehicle device 1 and the external device 2, a relatively new device will be referred to as a higher version, and a relatively older device will be referred to as a lower version.

In the higher version, a display mode may be changed with version update from a display mode in the lower version, for example, a size, a pattern, or a position of a displayed icon is changed, an icon that is present so far disappears, or a display name is changed. Without being limited to the display mode, in the higher version, an operation mode may be changed from an operation mode in the lower version, for example, a menu that is used so far disappears, a name is changed to a different name, or an operation procedure is changed due to a change in a hierarchical structure of the menu.

In other words, the HMI, such as the display mode or the operation mode, may be changed with the version update. In this case, since version update is basically performed to improve the performance or fix the problem, it is considered that the change in the HMI with the version update is performed to make the HMI more suitable.

However, when the HMI is changed, in addition to the need to learn a new operation mode, feeling of difficulty in the operation because the display mode is different from a familiar display mode, taking time and effort to perform a desired operation, or the like is assumed. In other words, it is assumed that the change of the HMI is a disadvantage to the user.

Therefore, the vehicle device 1 of the present embodiment enables selection to use which of the higher version and the lower version. That is, the vehicle device 1 executes processes related to the selection of whether to use the function of the external device 2, selection to use which data, and the selection of whether to use a function related to the HMI. Although these processes are basically performed by the data management unit 13 or the selection unit 14, the vehicle device 1 will be described below as a main body for the sake of simplicity of description.

Figure 15:
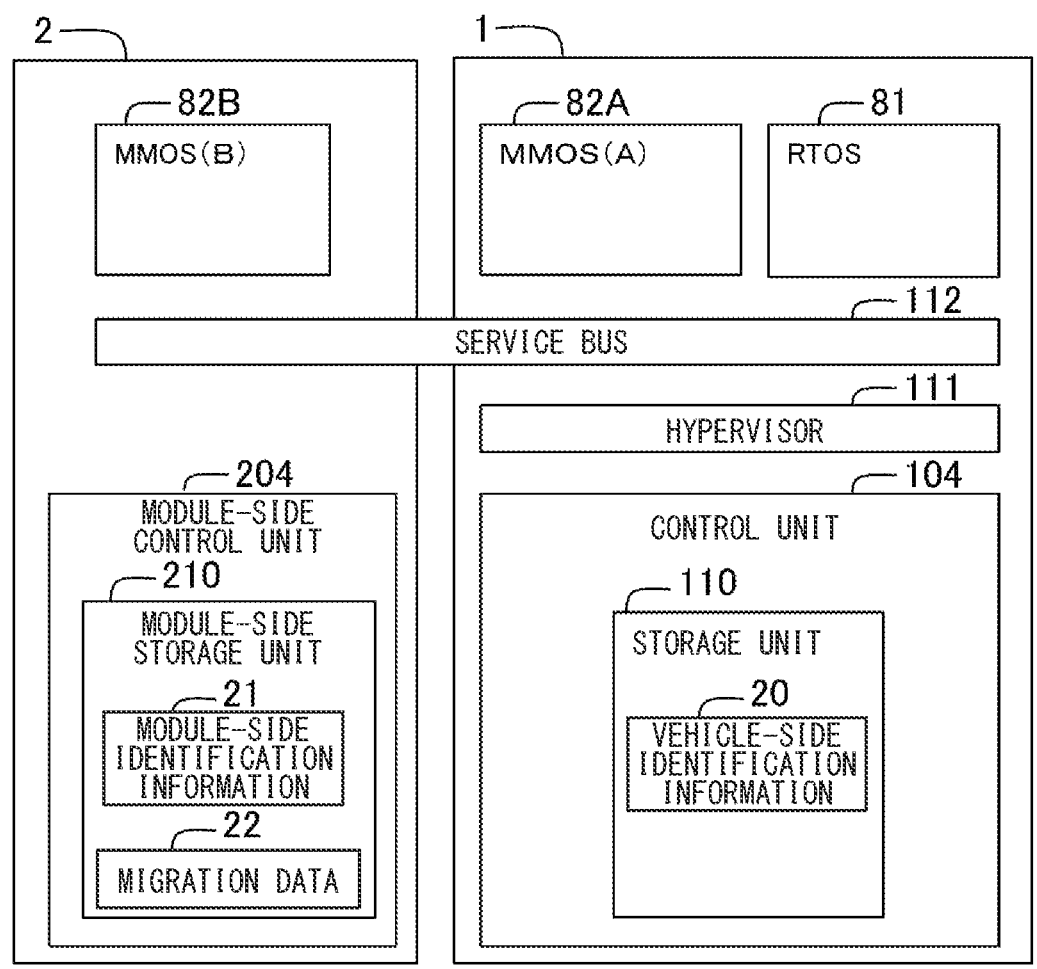
FIG. 15 is a diagram schematically illustrating a software configuration example in a third embodiment.

As illustrated in FIG. 15, vehicle-side identification information 20 is stored in the storage unit 110 of the vehicle device 1, and module-side identification information 21 and migration data 22 are stored in the module-side storage unit 210 of the external device 2. In FIG. 15, illustration of the firewall 113, the application 9, or the like is omitted for the sake of simplicity of description.

The vehicle-side identification information 20 is data including information for specifying the version of the vehicle device 1, and can be read from the RTOS 81 or the MMOS 82A. The vehicle-side identification information 20 includes, for example, information unique to the vehicle device 1, such as the serial number or date of manufacture, or information common to the vehicle devices 1 belonging to the same product group, such as the type or the version of the installed OS 8 or application 9.

The module-side identification information 21 is data including information for specifying the version of the external device 2, and can be read from the MMOS 82B.

The module-side identification information 21 includes, for example, information unique to the external device 2, such as the serial number or date of manufacture, or information common to the external devices 2 belonging to the same product group, such as the type or the version of the installed OS 8 or application 9. The migration data 22 includes data used by the external device 2 or data transferred from the vehicle device 1, such as the user information described above, and can be read from the MMOS 82B.

Therefore, by communicating with the external device 2, the vehicle device 1 can acquire the version of the external device 2 for each device or for each individual application 9, and can also acquire the migration data 22. In this case, for the migration data 22, by referring to the contents of the data, it is possible to selectively acquire the data that can be used by the peripheral devices 3 installed in the current vehicle. Similarly, the external device 2 can acquire the version of the vehicle device 1 for each device or for each individual application 9 by communicating with the vehicle device 1.

Figure 16:
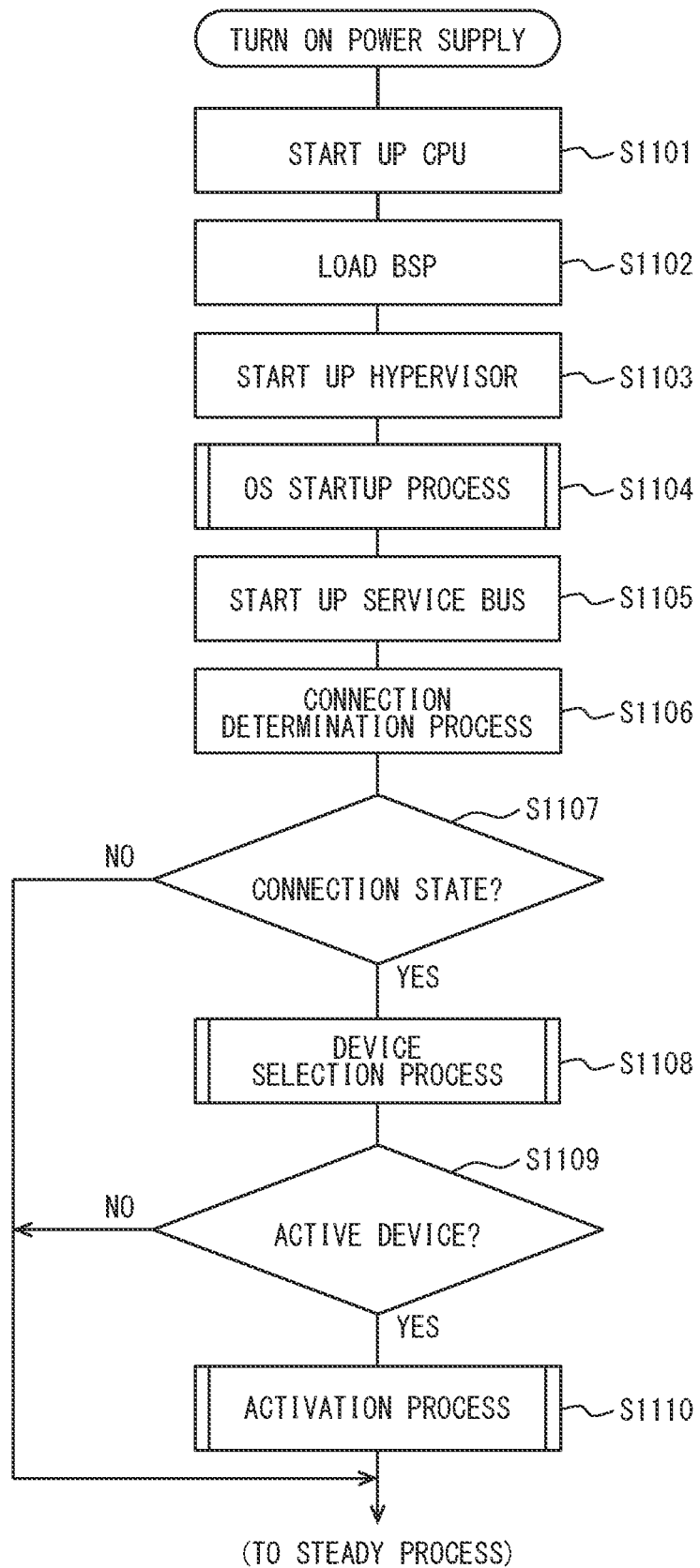
FIG. 16 is a diagram illustrating a flow of a process at startup.

In such a configuration, as illustrated in FIG. 16, the vehicle device 1 executes a device selection process for selecting whether to use the external device 2, for example, at the startup. However, the device selection process can be executed at any timing other than at the startup, even after the device selection process is executed once, in response to an instruction from the user or the worker as the dealer.

As in the sequence at the startup described in the first embodiment, the vehicle device 1 starts up the CPU 104 in step S1101 when the power supply is turned on, loads the BSP in step S1102, starts up the hypervisor 111 in step S1103, executes the OS startup process in step S1104, and starts up the service bus 112 in step S1105. Subsequently, the vehicle device 1 executes the connection determination process in step S1106, and when the vehicle device 1 determines that the external device 2 is in the connection state, YES is determined in step S1107, and thus the vehicle device 1 executes the device selection process in step S1108.

Figure 17:
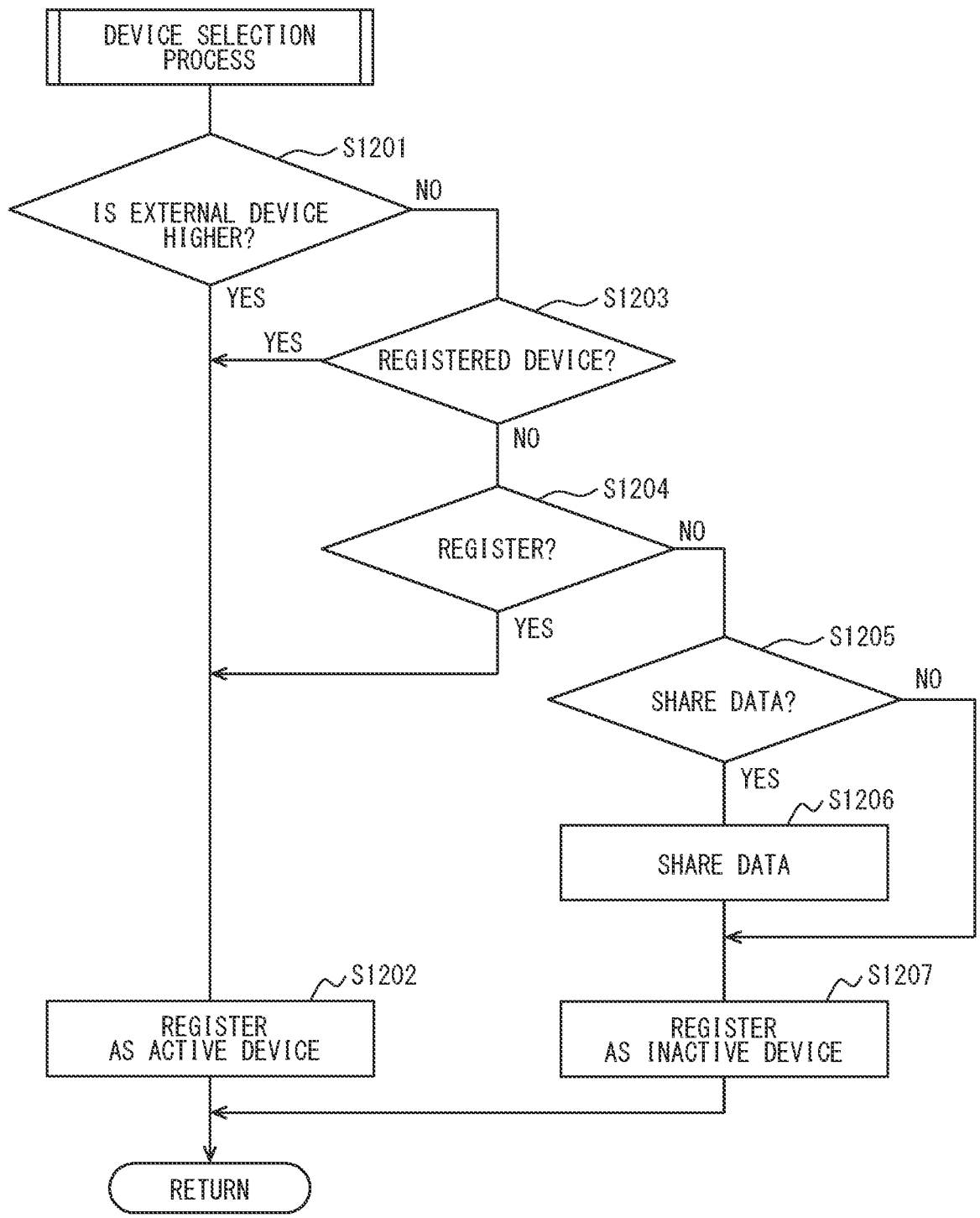
FIG. 17 is a diagram illustrating a flow of a device selection process.

In the device selection process, as illustrated in FIG. 17, the vehicle device 1 determines in step S1201 whether the external device 2 is the higher version. In this case, the vehicle device 1 refers to and compares the vehicle-side identification information 20 and the module-side identification information 21 to determine the higher version.

Although the vehicle device 1 can acquire the module-side identification information 21 from the external device 2 in step S1201 to perform the comparison, and can also acquire the module-side identification information 21 in advance in the connection determination process in step S1106 to perform the comparison in step S1201.

When the vehicle device 1 determines that the external device 2 is the higher version, YES is determined in step S1201, and thus the vehicle device 1 registers the external device 2 as an active device in step S1202 and returns. The active device means a device of which the use is permitted. That is, in steps S1201 and S1202, since it is considered that the performance is improved when the external device 2 of a newer version than the vehicle device 1 is connected, the vehicle device 1 uses the external device 2.

When the external device 2 is registered as the active device, information indicating that the external device 2 is registered as the active device is stored together with the module-side identification information 21, and is used to check whether the device is already registered at the next and subsequent connections. In other words, the vehicle device 1 can take over the state of the use at the next and subsequent times when the use of the external device 2 is selected, and take over the state of the non-use at the next and subsequent times when the non-use of the external device 2 is selected.

On the other hand, when the vehicle device 1 determines that the external device 2 is the lower version, NO is determined in step S1201, and thus the vehicle device 1 determines in step S1203 whether the external device 2 is a registered device that is previously registered as the active device.

When the vehicle device 1 determines that the external device 2 is the registered device, YES is determined in step S1203, and thus the vehicle device 1 proceeds to step S1202 to register the external device 2 as the active device and returns. In a case of the registered device, when the data, such as the user information or setting, is backed up at the previous use, the data is used for the operation.

On the other hand, when the vehicle device 1 determines that the external device 2 is the registered device, NO is determined in step S1203, and thus the vehicle device 1 determines in step S1204 whether to register the external device 2. In this case, the vehicle device 1 can display, for example, an icon or the like for selecting whether to register the external device 2 on the center display 301, wait for the operation of the user or the dealer, and determine to register the external device 2 when the operation to effect that the external device 2 is to be registered is input.

On the other hand, the vehicle device 1 can determine not to register the external device 2 when an operation to the effect that the external device 2 is not to be registered is input or when the operation is not performed within a predetermined time. The predetermined time can be set as appropriate, but the process is substantially the same as not waiting when the predetermined time is extremely short, and the process is substantially the same as waiting until the operation is input when the predetermined time is long.

When the vehicle device 1 determines to register the external device 2, YES is determined in step S1204, and thus the vehicle device 1 proceeds to step S1202 to register the external device 2 as the active device and returns. On the other hand, when the vehicle device 1 determines not to register the external device 2, NO is determined in step S1204, and thus the vehicle device 1 determines in step S1205 whether to share the data stored in the external device 2 with the vehicle device 1.

The reason is that, when the external device 2 of a relatively old version is connected, there is probability that the external device 2 is connected for the migration of the data as described in the second embodiment. In this case, the vehicle device 1 displays, for example, an icon or the like for selecting whether to share the data on the center display 301, waits for the operation of the user or the dealer, determines to share the data when an operation to the effect that the data is to be shared is input, and determines not to share the data when an operation to the effect that the data is not to be shared is input or when the operation is not performed within a predetermined time.

When the vehicle device 1 determines to share the data, YES is determined in step S1205, and thus the vehicle device 1 shares the data in step S1206. In this case, the vehicle device 1 can easily perform the sharing of the data between different vehicle devices 1, here, the migration of the data by acquiring and storing the migration data 22, which is stored in the external device 2, in the storage unit 110 of the vehicle device 1, or by registering, for example, the seat position, the steering wheel position, or the user information, such as the home address, the telephone directory, or the music, in the vehicle device 1.

When the data is shared, the vehicle device 1 registers the external device 2 as an inactive device in step S1207, and then returns. The inactive device means a device of which the use is not permitted. On the other hand, when the vehicle device 1 determines to share the data, NO is determined in step S1205, and thus the vehicle device 1 registers the external device 2 as the inactive device in step S1207, and then returns.

After returning from the device selection process, as illustrated in FIG. 16, the vehicle device 1 determines in step S1109 whether the external device 2 is the active device, and determines that the external device 2 is the active device when the external device 2 is registered as the active device in the device selection process, YES is determined in step S1109, and thus the vehicle device 1 executes the activation process in step S1110 and proceeds to the steady process. In the activation process, as illustrated in FIG. 6, the process, such as the synchronization of the OS 8, the restoration of the data, or the stop of the duplicate application, is executed as required.

On the other hand, when the vehicle device 1 registers the external device 2 as the inactive device in the device selection process, the vehicle device 1 determines that the external device 2 is not the active device, NO is determined in step S1109, and thus the vehicle device 1 proceeds to the steady process. However, the vehicle device 1 can directly execute the process for registering the external device 2 as the active device by executing the device selection process by, for example, the operation of the user or the worker as the dealer.

In other words, even when the external device 2 is once registered as the inactive device, the vehicle device 1 can re-register the external device 2 as the active device or perform the migration of the data. In other words, the vehicle device 1 enables the re-selection of whether to use the external device 2 that is selected once not to be used.

With the vehicle device 1 described above, following effects can be obtained. The vehicle device 1 includes the control unit 101, the connection portion 5 to which the external device 2 is connected, and the input unit 10 for inputting the operation, and backs up the data used by the external device 2 when an operation of removing the external device 2 is input. Accordingly, the same effects as in the first embodiment or the second embodiment can be obtained, for example, the performance for providing the function can be easily improved by connecting the external device 2 first.

The vehicle device 1 includes the control unit 101, the connection portion 5 to which the external device 2 is connected, and the selection unit 14 that executes the process related to the selection of whether to use the external device 2, and enables the use of the external device 2 when the use of the external device 2 is selected. Accordingly, for example, when there is the probability that the HMI or the operation mode is changed due to the version update, whether to use the external device 2 can be selected, and the usability can be improved.

In the vehicle device 1, the selection unit 14 allows the selection of whether to use the external device 2 itself. Accordingly, it is possible to select to use which of the vehicle device 1 and the external device 2 for each device, for example, it is possible to easily provide a new function.

The vehicle device 1 allows the selection of whether to use the function of the external device 2. Accordingly, it is possible to select to use which of the function of the vehicle device 1 and the function of the external device 2 for each function, and it is possible to provide the function in a more desirable state.

The vehicle device 1 allows the selection of whether to use the function related to the human-machine interface. Accordingly, it is possible to use the function with better usability, and it is possible to provide the function in a more favorable state.

The vehicle device 1 takes over the result of the selection of whether the external device 2 is to be used at next and subsequent operations. Accordingly, a desired environment can be reproduced without, for example, taking the time and effort to select the use each time at the startup.

The vehicle device 1 enables the re-selection of whether to use the external device 2 that is once selected not to be used. Accordingly, when the version is further updated and a new function is provided, the new function can be used easily. The same also applies to data described below.

When the use of the external device 2 is selected, the vehicle device 1 does not execute the function, which is executed by the external device 2. Accordingly, an increase in the power consumption can be reduced.

A configuration can be adopted in which the vehicle device 1 enables the use of the data used by the peripheral device 3. Accordingly, it is possible to reduce a case where useless data is stored when, for example, the vehicle is updated and the configuration of the peripheral device 3 is changed.

In the embodiment, the example has been illustrated in which the version of the vehicle device 1 and the version of the external device 2 are compared to determine the higher or lower version for each device, but as described below, a configuration can be adopted in which the higher or lower version is determined to select the activation/deactivation for each installed individual OS 8 or application 9, or for each the data, such as the user information.

In this case, the configuration in which the versions are compared also includes a configuration in which the functions of the devices are compared. The reason is that it is assumed that, in the higher version, the function that is not present in the lower version is added or the function that is present in the lower version is deleted. That is, when the function of the vehicle device 1 and the function of the external device 2 are different, a process for selecting whether to use the external device can be executed.

Figure 18:
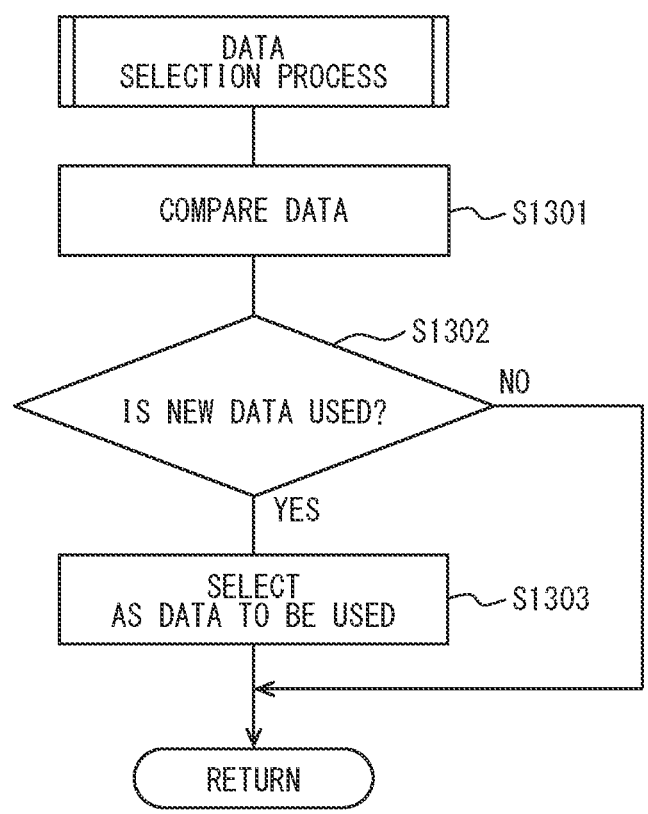
FIG. 18 is a diagram illustrating a flow of a data selection process.

The vehicle device 1 executes a data selection process illustrated in FIG. 18 in order to selectively use the data. The data selection process can be automatically executed at the startup, or can be executed at any timing based on an instruction of the user or the worker as the dealer.

For example, a configuration can also be adopted in which the data selection process is executed when the external device 2 is connected for the first time, and the data selection process is not executed for the registered external device 2 at the next and subsequent connections. That is, the vehicle device 1 can take over the result of the selection of whether to use the device or the data in the next and subsequent operations.

Although the data selection process is basically executed by the selection unit 14, the vehicle device 1 will be described below as a main body for the sake of simplification of description. Hereinafter, new data corresponding to the higher version will be referred to as new data, and old data corresponding to the lower version will be referred to as old data.

The data stored in the vehicle device 1 also includes the backup data described above. Since the OS 8 or the application 9 can also be regarded as data in a broad sense, the OS 8 and the application 9 are collectively referred to as data here. That is, the vehicle device 1 enables the selection of whether to use the data stored by the external device 2.

The vehicle device 1 first compares the data stored in the vehicle device 1 and the data stored in the external device 2 in step S1301, and determines whether to use the new data in step S1302.

In this case, the vehicle device 1 displays, for example, an icon or the like for selecting whether to use the new data on the center display 301, waits for the operation of the user or the dealer, determines to use the new data when an operation to the effect that the new data is to be used is input, and determines not to use the new data when an operation to the effect that the new data is not to be used is input or when the operation is not performed within a predetermined time. However, a configuration can also be adopted in which the new data is preferentially used without providing step S1302.

When the vehicle device 1 determines to use the new data, YES is determined in step S1302, and thus the vehicle device 1 selects the new data as the data to be used in step S1303 and returns. In this case, the vehicle device 1 enables the use of the new data by overwriting the old data with the new data or performing the migration of the new data to the device that stores the old data. That is, the OS 8 or the application 9 is operated by using the new data.

On the other hand, when the vehicle device 1 determines to use the new data, NO is determined in step S1302, and thus the vehicle device 1 omits step S1303 and returns. That is, the vehicle device 1 allows each device to operate in the same environment as before without updating the data. Accordingly, it is possible to reduce a case where the operation environment is changed unintentionally.

As described above, the vehicle device 1 can be configured to compare the data stored in the external device 2 and the data stored in the vehicle device 1, select the newer data, and enable the use. With such a configuration, it is possible to select to use which of the new data and the old data when the data stored in the respective devices are different.

For example, even in the case where the version of the external device 2 is old, when a certain application 9 is updated and is a newer version than the application 9 of the vehicle device 1, a process for regarding the external device 2 as a higher version and activating the external device 2 can be executed for the application 9.

In this case, the vehicle device 1 can check the version of the application 9 that is installed on the external device 2 and is compatible with the application 9 installed on the vehicle device 1. That is, the function of the vehicle device 1 and the function of the external device 2 can be compared.

The vehicle device 1 can repeat the check of the version for each application 9, but for example, the vehicle device 1 can also acquire information including the application 9 of the external device 2 and each version in a case of communicating with the external device 2 in the connection determination process, and check the versions of multiple applications 9. The same also applies to the OS 8 installed on each device.

By adopting a configuration in which whether to use the lower version can be selected, the continuous use of a familiar environment is enabled. For example, the application 9 of a newer version than the application 9 installed on the vehicle device 1 is installed on the external device 2.

In that case, when the higher version is activated as in the embodiment, it is assumed that an HMI different from the application 9 of the lower version installed on the vehicle device 1 is provided. Even in such a case, by enabling the selection of whether to use which of the higher version and the lower version, the device can be used without requiring skill in operation.

Even with the vehicle system 4 including the vehicle device 1 and the external device 2, various effects described above can be obtained in the same manner, for example, whether to use the external device 2 can be selected when there is probability that the HMI or the operation mode is changed due to the version update, and the usability can be improved.

In each of the embodiments described above, all or a part of the configurations can be combined as appropriate with all or a part of the configurations of other embodiments, for example, the process illustrated in the second embodiment is executable during the steady process in the first embodiment.

Although the present disclosure has been described according to the examples, it is understood that the present disclosure is not limited to the examples or the structures. The present disclosure includes various modifications or deformations within an equivalent range. In addition, various combinations or forms, and further, other combinations or forms including only one element, one more elements, or one or less elements are also included in the scope or spirit of the present disclosure.

The control unit and the method described in the present disclosure may be implemented by a dedicated computer provided by configuring a processor and a memory programmed to execute one or multiple functions embodied by a computer program. Alternatively, the control unit and the method described in the present disclosure may be implemented by a dedicated computer provided by forming a processor with one or more dedicated hardware logic circuits. Alternatively, the control unit and the method described in the present disclosure may be implemented by one or more dedicated computers including a combination of a processor and a memory programmed to execute one or multiple functions and a processor including one or more hardware logic circuits. The computer program may also be stored on a computer-readable and non-transitory tangible recording medium as an instruction executed by a computer.

The invention claimed is:

1. A vehicle device, comprising:
   a control unit that is configured to access a peripheral device and execute functions of the control unit when a vehicle is used;
   a connection portion to which an external device is connected, the external device being communicable with the control unit and configured to execute a function of the external device when the vehicle is used; and
   a determination unit that is configured to determine whether the external device is connected to the connection portion in an executable state where the external device is capable of executing the function of the external device, wherein
   the control unit is further configured to:
      activate the external device to enable execution of the function of the external device and stop at least one function among the functions of the control unit when the external device is determined to be connected to the connection portion in the executable state where the external device is capable of executing the function of the external device; and
      execute the at least one function of the control unit that is being stopped for the external device executing the function of the external device when the external device is determined, during operation of the vehicle device, to be no longer in the executable state where the external device is capable of executing the function of the external device, and the determination unit is further configured to determine that (i) the external device is in the executable state when receiving a response from the external device after sending data for connection confirmation to the external device and (ii) the external device is in a non-executable state when receiving no response from the external device within a predetermined time period after sending the data for connection confirmation to the external device.

2. The vehicle device according to claim 1, wherein the control unit is further configured to stop a duplicate function among the functions of the control unit that corresponds to the function executed by the external device.

3. The vehicle device according to claim 1, wherein the control unit is further configured to specify the function executed by the external device and stop a function of the control unit corresponding to the specified function.

4. The vehicle device according to claim 1, wherein the control unit is further configured to stop the at least one function of the control unit by stopping operation of an application that implements the at least one function of the control unit.

5. The vehicle device according to claim 1, wherein the control unit is further configured to stop the at least one function of the control unit by stopping operation of an operating system in which an application that implements the at least one function of the control unit is installed.

6. A vehicle device, comprising:
a control unit that is configured to access a peripheral device and execute functions of the control unit when a vehicle is used;
a connection portion to which an external device is connected, the external device being communicable with the control unit and configured to execute a function of the external device when the vehicle is used; and
a determination unit that is configured to determine whether the external device is connected to the connection portion in an executable state where the external device is capable of executing the function of the external device, wherein
the determination unit is further configured to repeatedly determine whether the external device is in the executable state where the external device is capable of executing the function of the external device during operation of the vehicle device, the control unit is further configured to activate the external device to enable execution of the function of the external device and stop at least one function among the functions of the control unit when the external device is determined to be connected to the connection portion in the executable state where the external device is capable of executing the function of the external device, and the determination unit is further configured to determine that (i) the external device is in the executable state when receiving a response from the external device after sending data for connection confirmation to the external device and (ii) the external device is in a non-executable state when receiving no response from the external device within a predetermined time period after sending the data for connection confirmation to the external device.

7. A vehicle device, comprising:
at least one processor; and
a connection portion to which an external device is connected, the external device being communicable with the processor and configured to execute a function of the external device when a vehicle is used, wherein
the at least one processor is configured to:
access a peripheral device and execute functions of the vehicle device when the vehicle is used;
determine whether the external device is connected to the connection portion in an executable state where the external device is capable of executing the function of the external device;
activate the external device to enable execution of the function of the external device and stop at least one function among the functions of the vehicle device when the external device is determined to be connected to the connection portion in the executable state where the external device is capable of executing the function of the external device; and
execute the at least one function of the vehicle device that is being stopped for the external device executing the function of the external device when the external device is determined, during operation of the vehicle device, to be no longer in the executable state where the external device is capable of executing the function of the external device, and the at least one processor is further configured to determine that (i) the external device is in the executable state when receiving a response from the external device after sending data for connection confirmation to the external device and (ii) the external device is in a non-executable state when receiving no response from the external device within a predetermined time period after sending the data for connection confirmation to the external device.

* * * * *